(12) United States Patent
Otsuka et al.

(10) Patent No.: US 6,778,308 B2
(45) Date of Patent: Aug. 17, 2004

(54) PROCESS OF FABRICATING SEMICONDUCTOR LIGHT EMITTING DEVICE

(75) Inventors: Nobuyuki Otsuka, Kawanishi (JP); Shigeo Yoshii, Hirakata (JP); Masahiro Kitoh, Suita (JP); Toshiya Yokogawa, Nara (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/652,044

(22) Filed: Sep. 2, 2003

(65) Prior Publication Data

US 2004/0080803 A1 Apr. 29, 2004

Related U.S. Application Data

(63) Continuation of application No. PCT/JP03/00004, filed on Jan. 7, 2003.

(30) Foreign Application Priority Data

Jan. 7, 2002 (JP) ........................................ 2002-000336

(51) Int. Cl.$^7$ .............................................. G02F 1/015
(52) U.S. Cl. ...................................... 359/254; 359/245
(58) Field of Search ................................ 359/254, 245, 359/315; 385/2, 8, 9

(56) References Cited

U.S. PATENT DOCUMENTS

| | | | |
|---|---|---|---|
| 4,828,368 A | | 5/1989 | Efron et al. |
| 5,008,717 A | | 4/1991 | Bar-Joseph et al. |
| 5,034,783 A | | 7/1991 | Chang et al. |
| 5,309,531 A | * | 5/1994 | Sheehy .......................... 385/2 |
| 6,219,170 B1 | | 4/2001 | Kimura et al. |
| 6,252,221 B1 | | 6/2001 | Kaneko et al. |

FOREIGN PATENT DOCUMENTS

| | | |
|---|---|---|
| JP | 01-94689 | 4/1989 |
| JP | 05-152674 | 6/1993 |
| JP | 05-281499 | 10/1993 |
| JP | 08-262379 | 10/1996 |
| JP | 11-103135 | 4/1999 |
| JP | 11-133365 | 5/1999 |
| JP | P2001-66559 A | 3/2001 |

OTHER PUBLICATIONS

Kuwamura, Y. et al., "Panel–Type Semiconductor Optical Modulator Using Electron Depleting Absorption Control", Japanese Journal of Applied Physics, vol. 32, Part 1, No. 1B, pp. 578–582 (1993).

(List continued on next page.)

Primary Examiner—Scott J. Sugarman
Assistant Examiner—Richard Hanig
(74) Attorney, Agent, or Firm—McDermott Will & Emery LLP

(57) ABSTRACT

A vertical optical modulator comprising: a first semiconductor layer of a first conductivity type; a second semiconductor layer of a second conductivity type bonded to the first semiconductor layer; a third semiconductor layer of the second conductivity type; a dielectric layer formed between the second semiconductor layer and the third semiconductor layer; an antenna electrode having a plurality of conductive pieces which are formed within the dielectric layer so as to have a net-like shape as a whole, to be separated from one another at the intersections of the net-like shape, and to be in contact with both the second semiconductor layer and the third semiconductor layer; a first electrode electrically connected to the first semiconductor layer; and a second electrode electrically connected to the third semiconductor layer.

14 Claims, 18 Drawing Sheets

OTHER PUBLICATIONS

Yamada, M. et al., "Semiconductor Optical Modulator by Using Electron Depleting Absorption Control", IEICE Transactions on Electronics, vol. E75–C, No. 9, pp. 1063–1070 (1992).

Yuji Kuwamura et al., "Taju Ryoishi Ido Kozo O Mochita Taiden'atsu Kudo Heimengata Hikari Henchoki No Sekkei", The Institute of Electronics, Information and Communication Engineers Gijutsu Kenkyu Hokoku, vol. 98, No. 41 (LQE98–1 to 14), pp. 73–78 (1998).

Yuji Kuwamura et al., "Denshi Kuboka O Mochita Heimengata Handotai Hikari Henchoki No Sekkei Oyobi Shisaku", The Transactions of the Institute of Electronics, Information and Communication Engineers C–I, vol. J81–C–I, No. 2, pp. 55–65 (1998).

Yuji Kuwamura et al., "Denki Kuboka O Mochita Handotai Hikari Henchoki No Dosa Kiko Kaiseki", The Transactions of the Institute of Electronics, Information and Communication Engineers C–I, vol. J78–C–I, No. 12, pp. 618–625 (1995).

Levin M., et al., "Electro–Optical Structure With High Speed and High Reflectivity Modulation", Applied Physics Letters, vol. 68, No. 7, pp. 882–884 (1996).

* cited by examiner

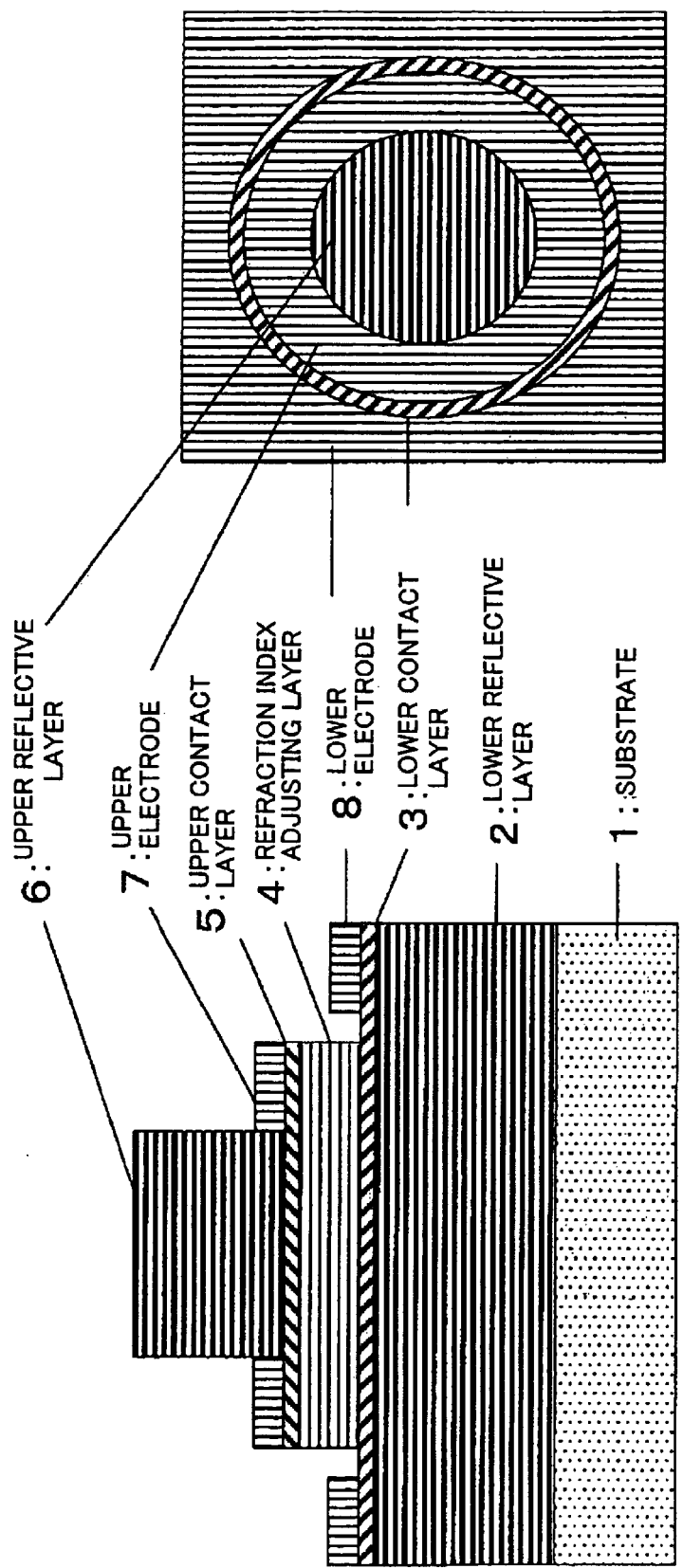

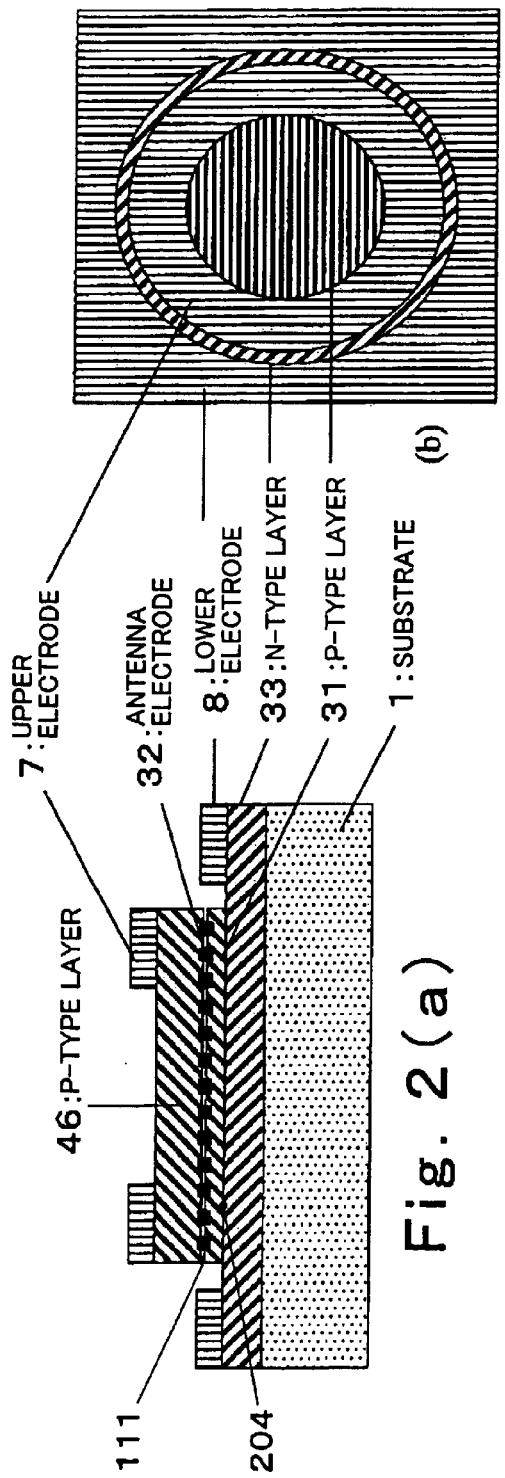
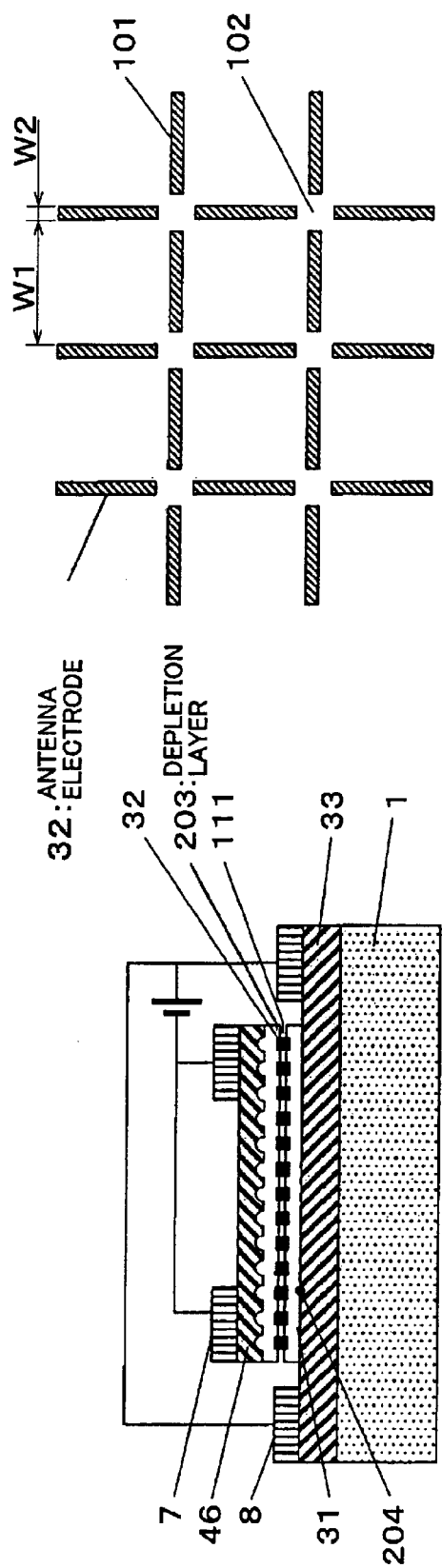
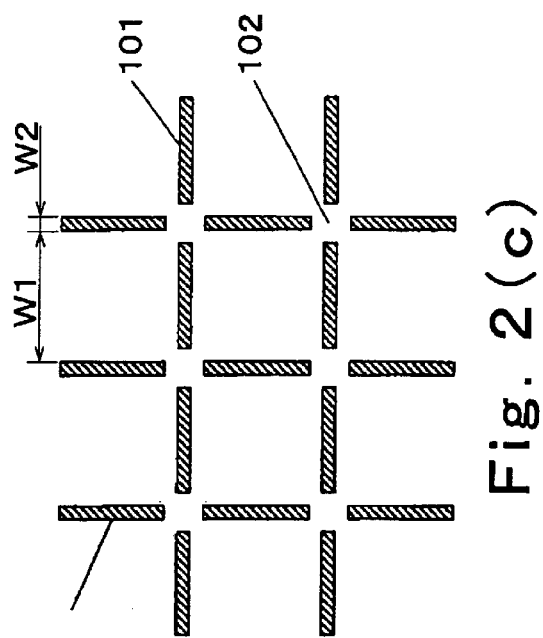
Fig. 2(a)
Fig. 2(b)
Fig. 2(c)

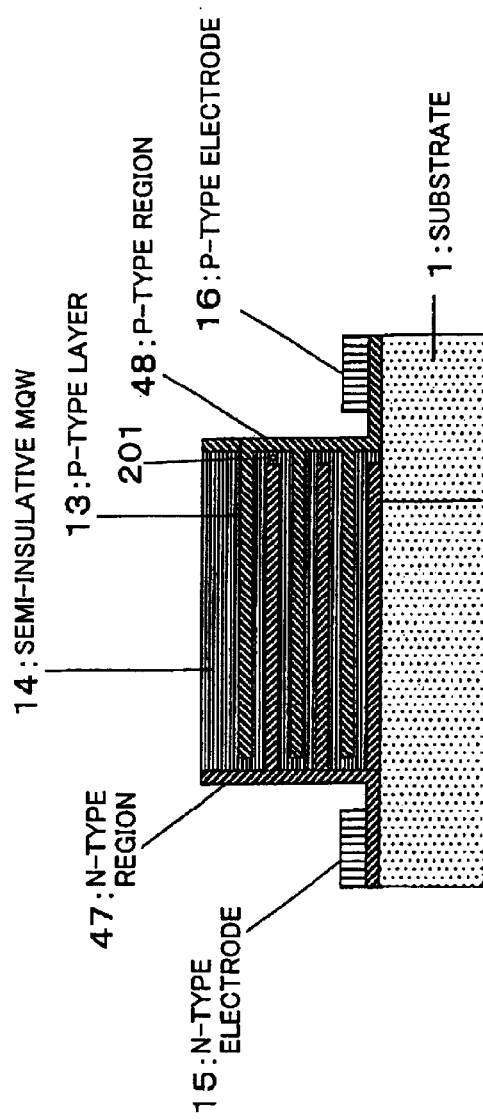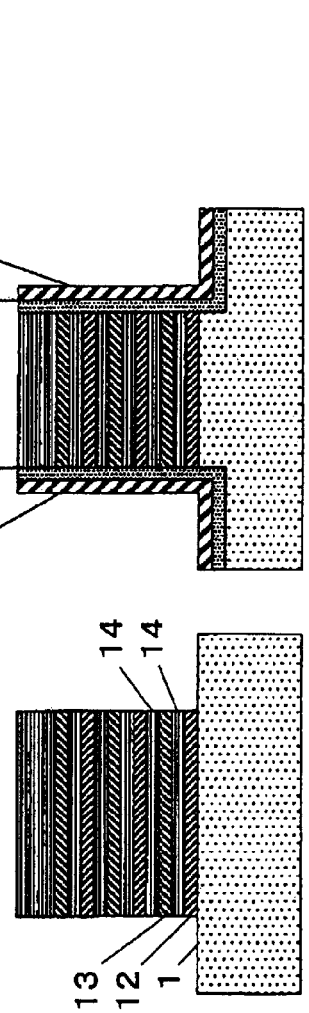

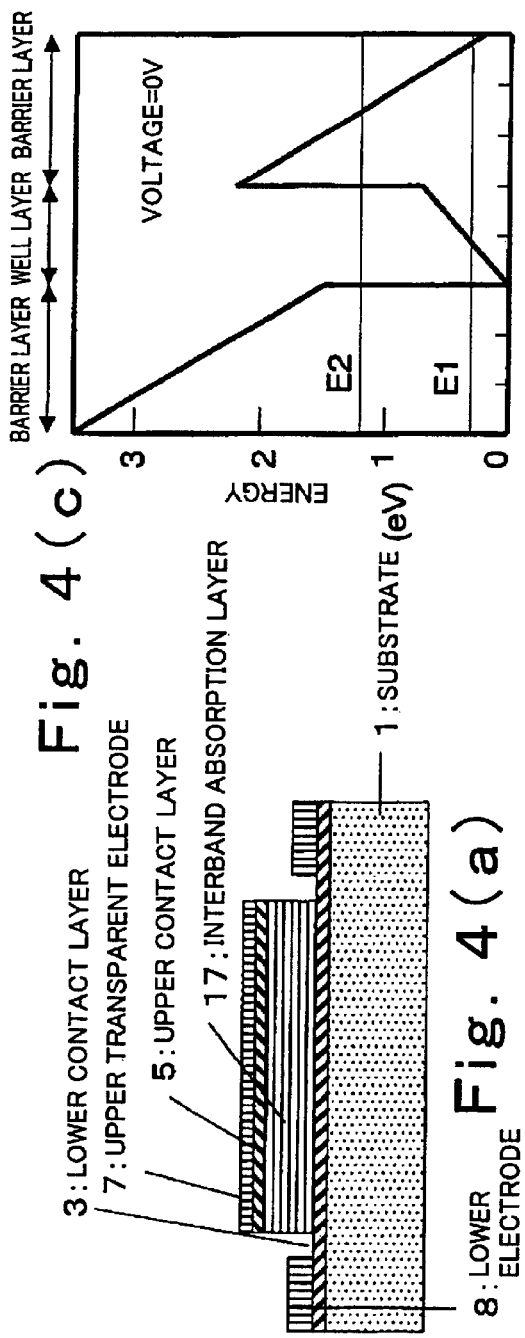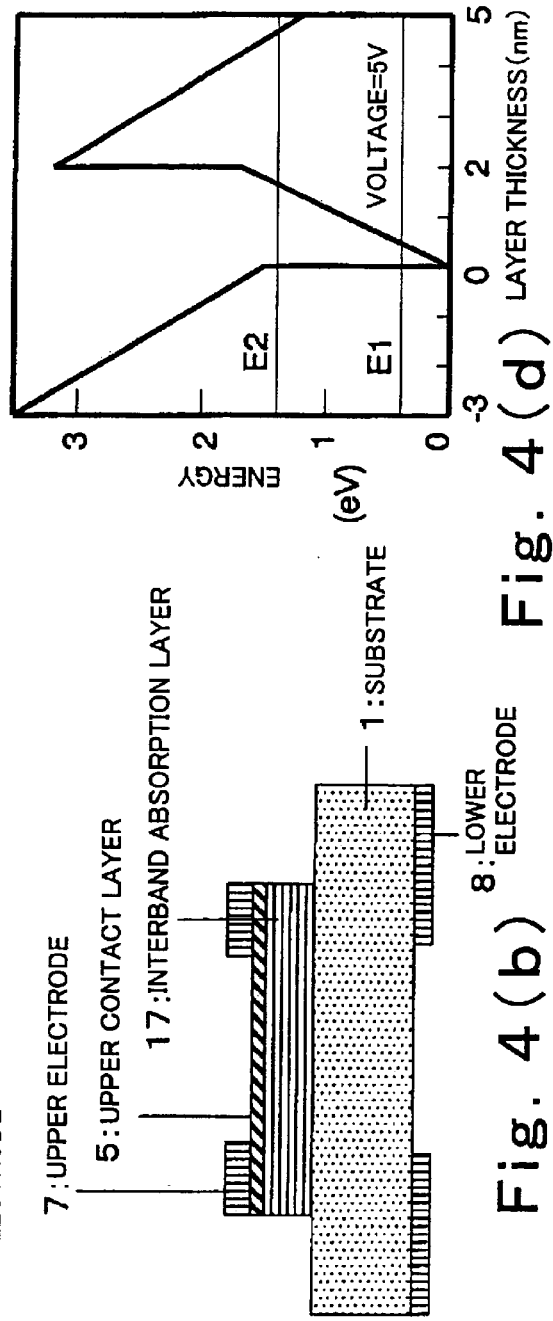

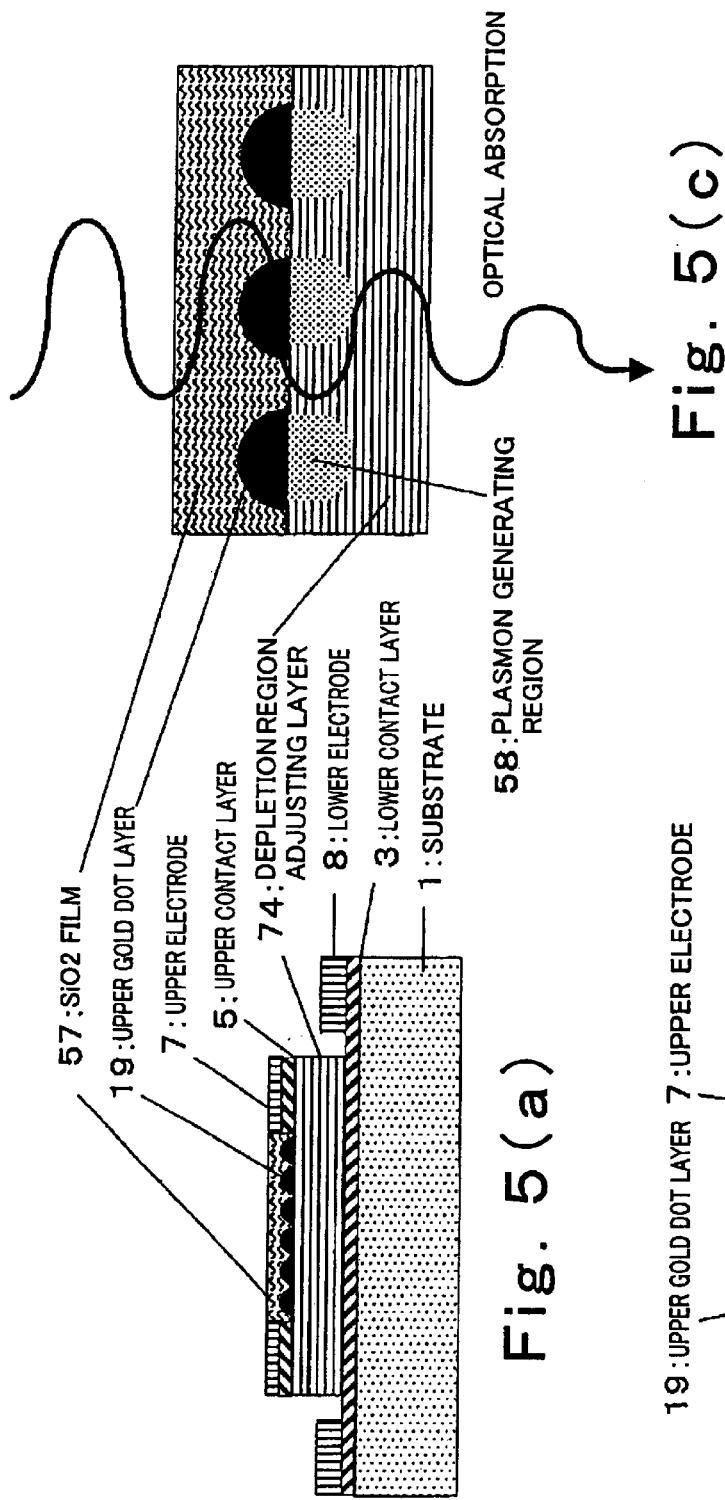

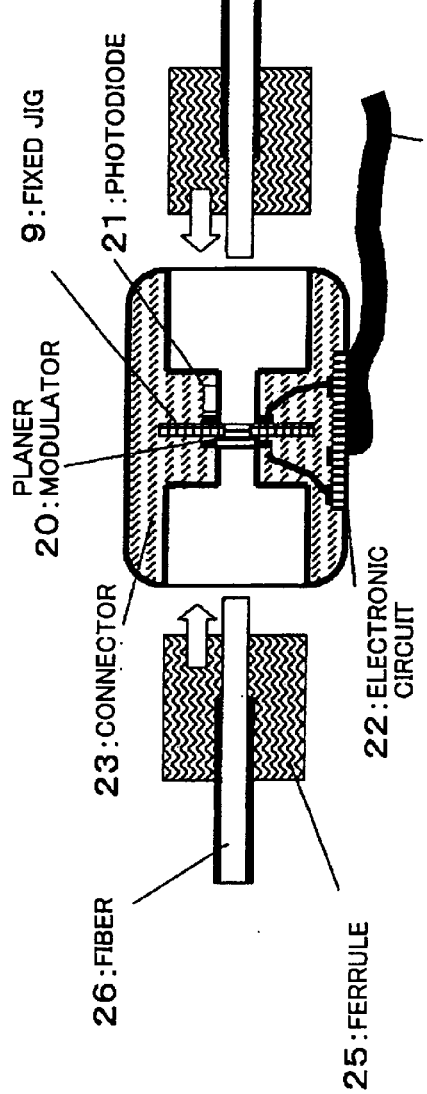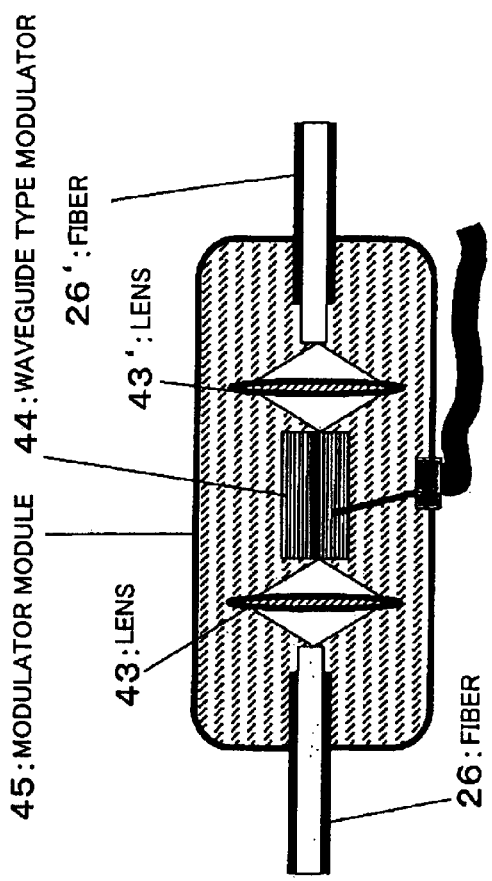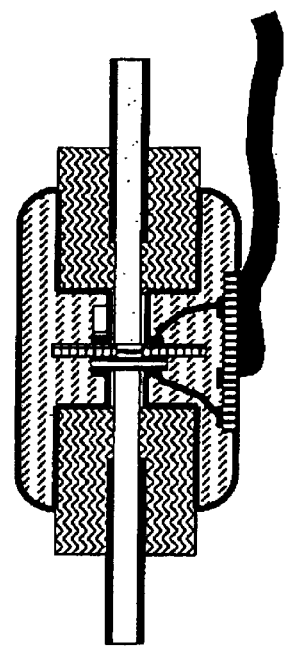
Fig. 7(a)
Fig. 7(b)
Fig. 7(c)

34: ROUNDED-END FIBER

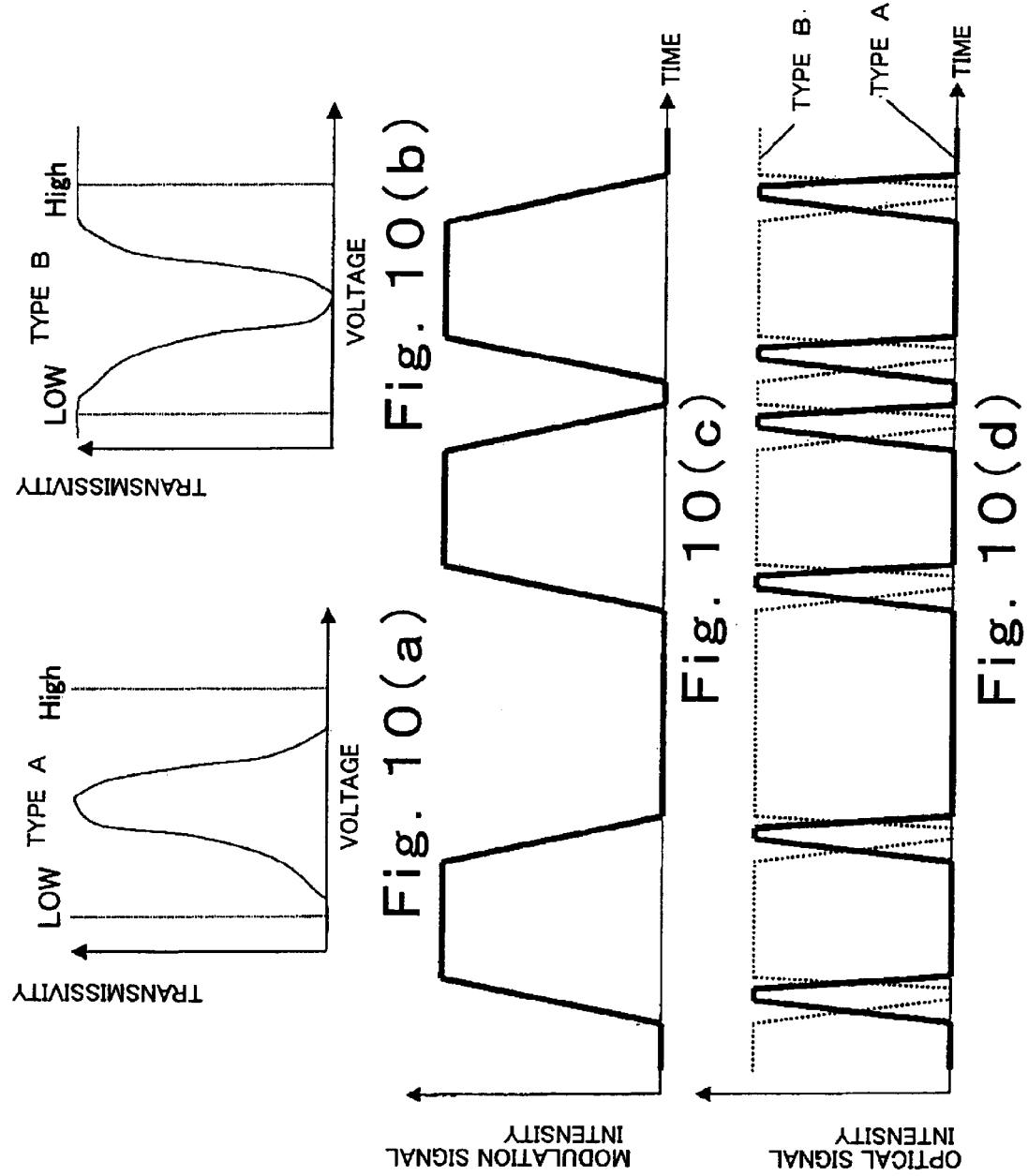

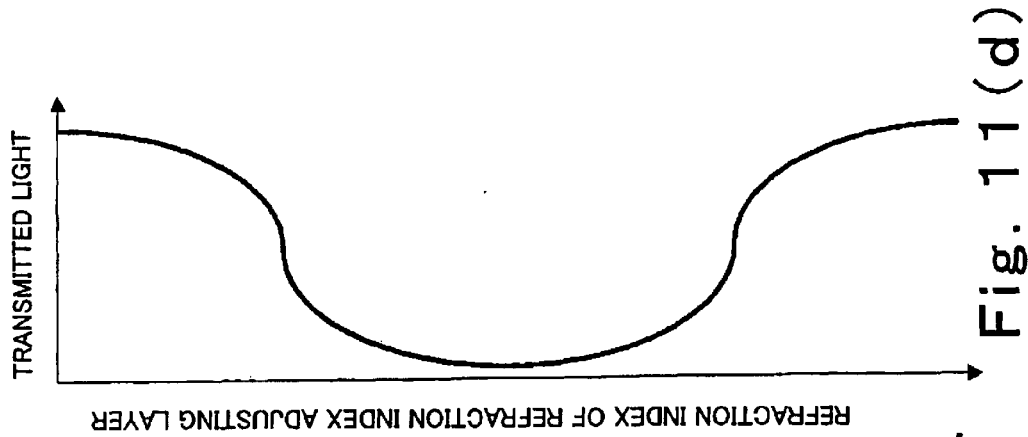
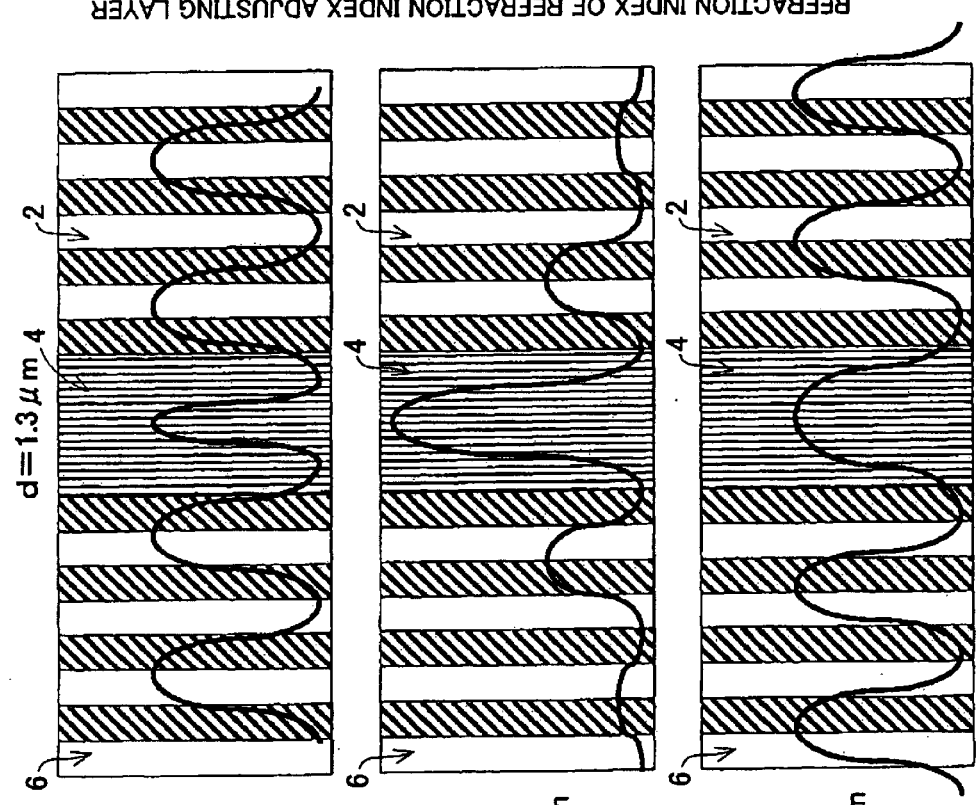
Fig. 11(a) Fig. 11(b) Fig. 11(c) Fig. 11(d)

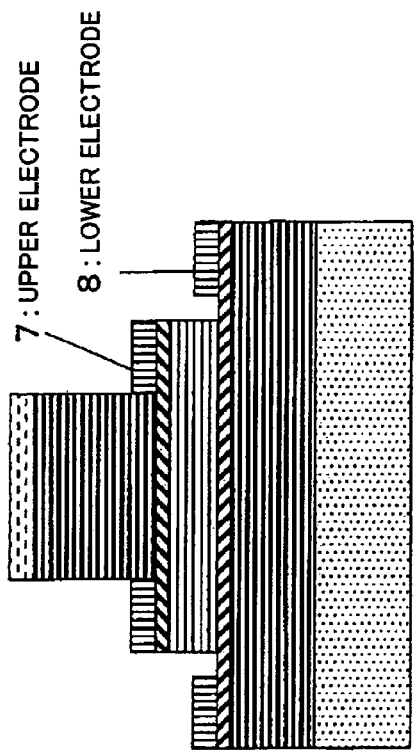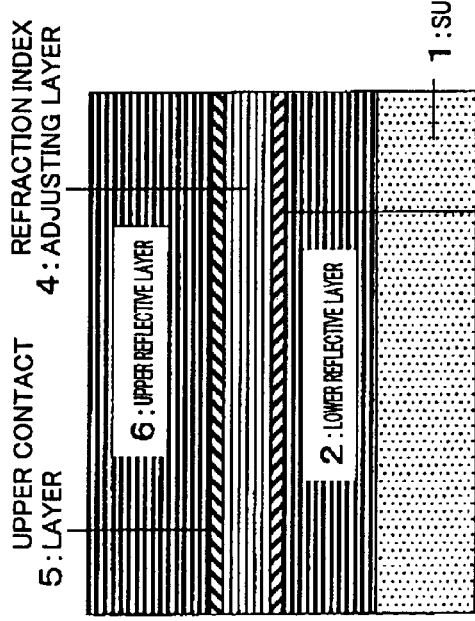
Fig. 13(a), Fig. 13(b), Fig. 13(c), Fig. 13(d)

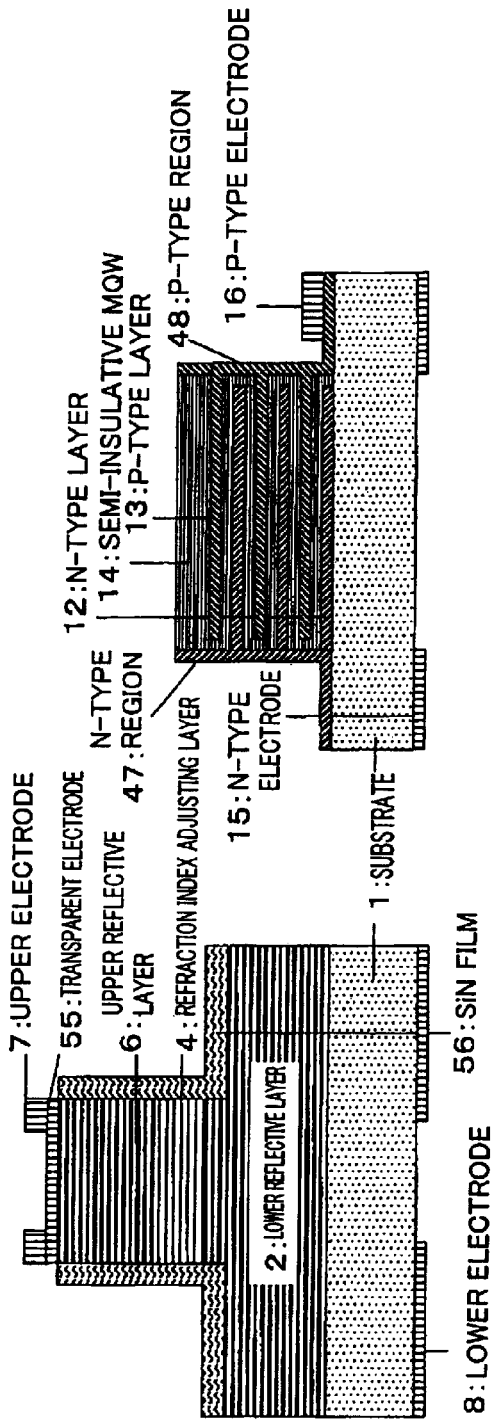
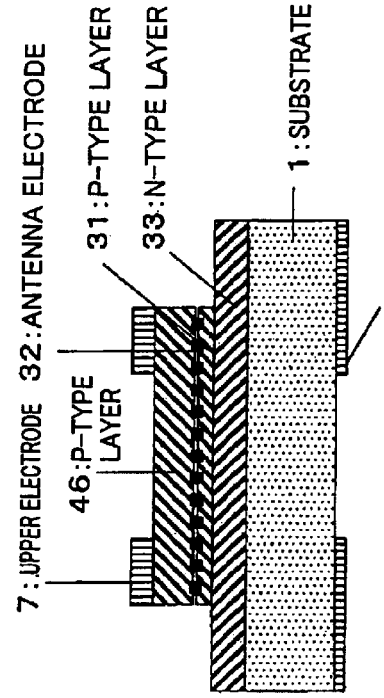
Fig. 14(a)
Fig. 14(b)
Fig. 14(c)

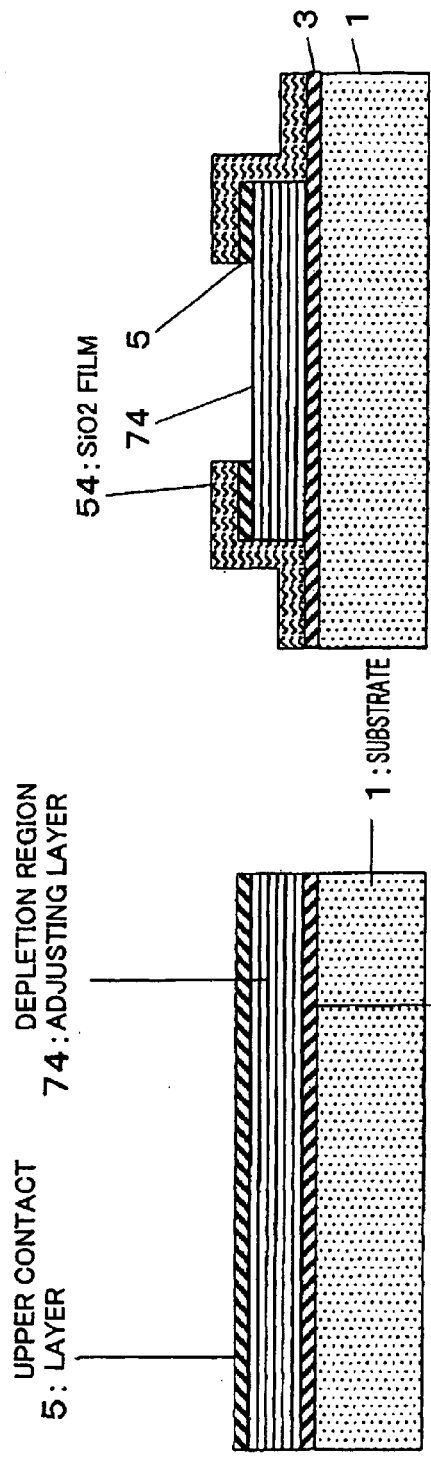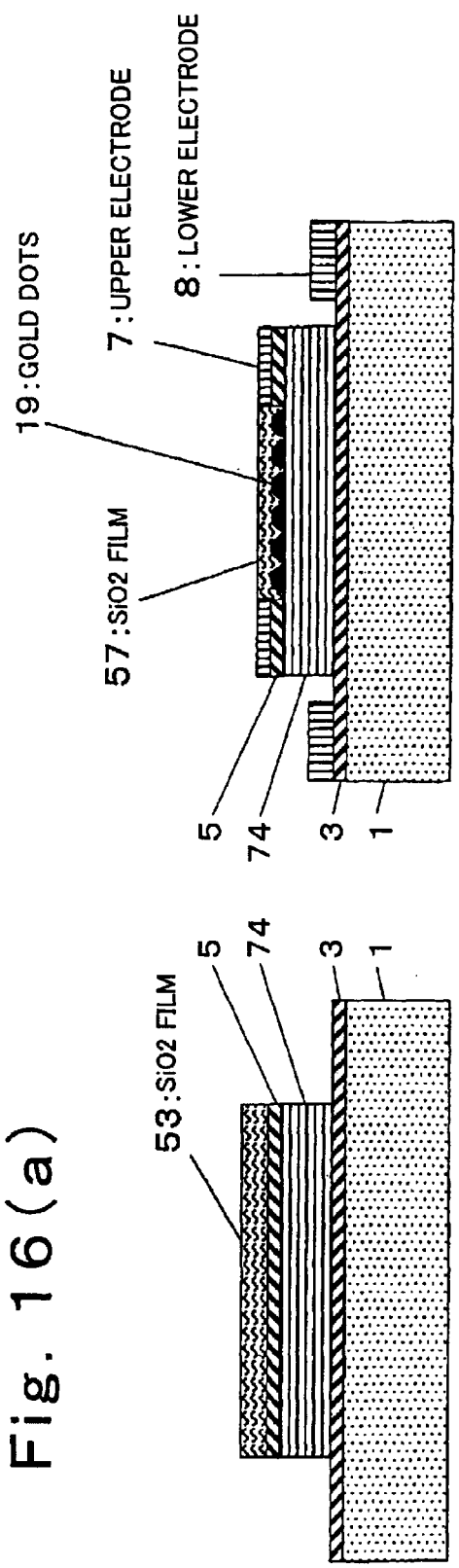

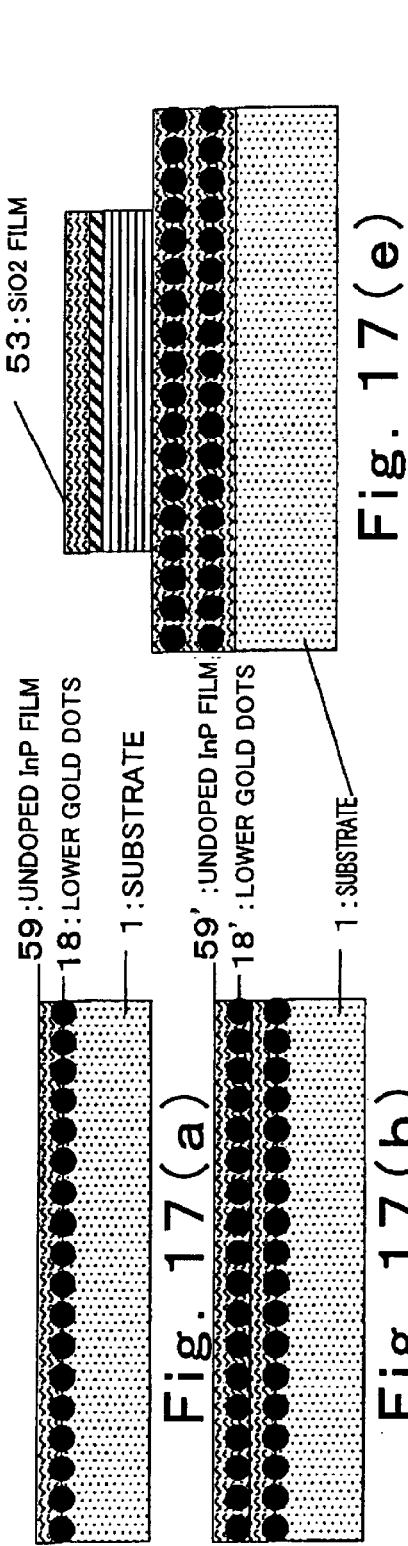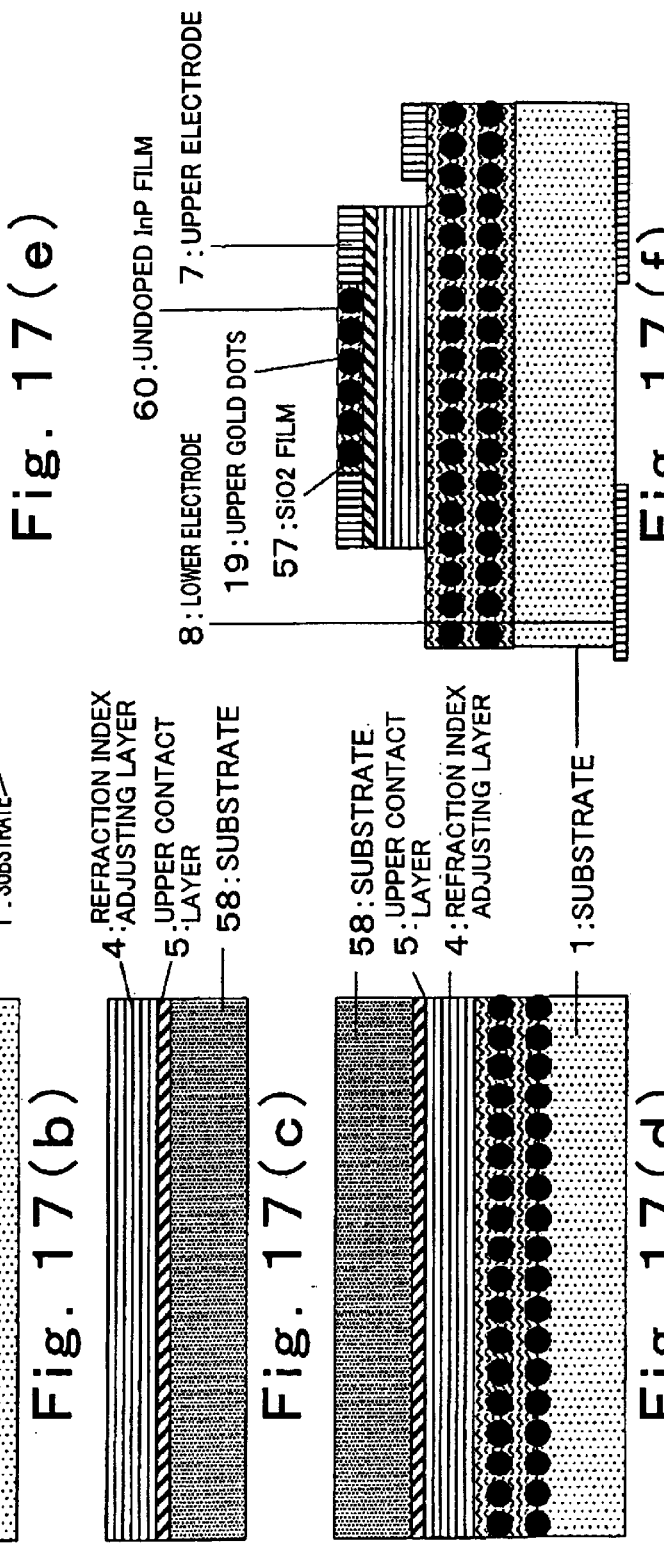

PROCESS OF FABRICATING SEMICONDUCTOR LIGHT EMITTING DEVICE

This is a continuation application under 35 U.S.C. 111(a) of pending prior International Application No. PCT/JP03/00004, filed on Jan. 7, 2003.

BACKGROUND OF THE INVENTION

1. Field of the Invention

The present invention relates to a vertical incidence type vertical optical modulator grown on a substrate, device driving method and fabrication process thereof.

2. Description of the Related Art

The following is an example of prior art semiconductor laser structures (Kasahara et. al., Japanese Patent Kokai Publication No. 5-152674 (see FIG. 12)). In FIG. 12, reference numeral 101 designates a semi-insulative GaAs substrate; 102 designates an Si-doped mirror having alternating laminated layers of n-GaAs and n-AlAs; 103 designates an undoped $Al_{0.25}Ga_{0.75}As$ layer; 104 designates an undoped InGaAs active layer; 105 designates an undoped $Al_{0.25}Ga_{0.75}As$ layer; 106 designates a Be-doped mirror having laminated layers of p-GaAs and p-AlAs; 107 designates a p-GaAs (3 λ thick) layer; 108 designates a optical absorption layer composed of three InGaAs strain quantum well layers and a GaAs barrier layer (46 nm thick); and 109 designates an undoped GaAs layer (λ thick). Reference numeral 110 designates an Si-doped mirror in which n-GaAs layers (λ/4 thick, $n=2\times10^{18}$ $cm^{-3}$) and n-AlAs layers (λ/4 thick, $n=2\times10^{18}$ $cm^{-3}$) are alternately laminated in 24.5 cycles. Reference numeral 111 designates a SiN film, 114 and 112 designate an n-side electrode and 113 designates a p-side electrode.

The device is operated under the condition where the n-side electrode 114 is grounded and a positive voltage is applied to the p-side electrode 113 whereas a negative voltage being applied to the n-side electrode 112. Since an electric field is applied to the optical absorption layer 108 which is reversely biased, the band end is shifted to longer wavelengths owing to the Franz Keldysh effect and light from the InGaAs active layer 104 can be turned ON and OFF. By virtue of the arrangement in which the optical absorption layer 108 is disposed between the Be doped mirror 106 and the Si-doped mirror 110, nearly 100% absorption can be accomplished at the time of voltage application even though the actual film thickness of the optical absorption layer 108 is only 30 nm.

In the prior art, since the absorption coefficient of the optical absorption layer 108 is only 1,000 to 10,000 $cm^{-1}$, the extinction ratio is increased by letting light reflect and reciprocate between the Be-doped mirror 106 and the Si-doped mirror 110. This approach, however, has presented the problem that the intensity of the out-going light is significantly low because the light modulated by the light absorption layer 108 reflects at the Si-doped mirror 110.

Other known vertical optical modulators are disclosed in Japanese Patent Kokai Publication No. 7-307464 (particularly in the paragraph No. 0010) and Japanese Patent Application No. 2000-275692.

SUMMARY OF THE INVENTION

The present invention has been made with the object of overcoming the foregoing problems.

This object can be accomplished by a vertical optical modulator according to the invention comprising: a first reflective layer having a quantum well structure formed on a substrate; a refraction index adjusting layer having a quantum well structure formed on the first reflective layer; a second reflective layer having a quantum well structure formed on the refraction index adjusting layer; a first electrode electrically connected to the underside of the refraction index adjusting layer; and a second electrode electrically connected to the upper surface of the refraction index adjusting layer, wherein a bandgap of the quantum well structure of the refraction index adjusting layer is larger than those of the quantum well structures of the first and second reflective layers.

The first and second reflective layers may have a quantum well structure wherein metal dots are regularly, three-dimensionally arranged.

The metal dots may be gold dots and the refraction index adjusting layer may have a quantum well structure including InP.

According to the invention, there is provided a vertical optical modulator comprising:

a first semiconductor layer of a first conductivity type;

a second semiconductor layer of a second conductivity type joined to the first semiconductor layer;

a third semiconductor layer of the second conductivity type;

a dielectric layer formed between the second semiconductor layer and the third semiconductor layer;

an antenna electrode having a plurality of conductive pieces which are formed within the dielectric layer so as to have a net-like shape as a whole, to be separated from one another at the intersections of the net-like shape, and to be in contact with both the second semiconductor layer and the third semiconductor layer;

a first electrode electrically connected to the first semiconductor layer; and a second electrode electrically connected to the third semiconductor layer.

Preferably, the width of the conductive pieces is substantially one third the spacing between the conductive pieces in a width-wise direction thereof.

Preferably, where the wavelength of a signal light modulated by the vertical optical modulator is λ, the width of the conductive pieces is substantially λ/3 and the spacing between the conductive pieces in a width-wise direction thereof is substantially λ.

The plurality of conductive pieces may have the form of a lattice net as a whole.

The dielectric layer may be an air layer.

Preferably, concentration of an impurity of the second conductivity type of the second and third semiconductor layers is lower than that of an impurity of the first conductivity type of the first semiconductor layer.

The first semiconductor layer may be formed on a semiconductor substrate.

The semiconductor substrate may be semi-insulative and the first electrode may be formed on the first semiconductor layer whereas the second electrode being formed on the third semiconductor layer.

The semiconductor substrate may be electrically conductive and the first electrode may be formed at the underside of the substrate whereas the second electrode being formed on the third semiconductor layer.

The semiconductor substrate may be of the first conductivity type.

In a plan view, the first semiconductor layer, the second semiconductor layer, the antenna electrode and the third semiconductor layer have the form of a circle substantially having a first diameter, and either one of the first and second electrodes has the form of a circular ring having an outer diameter substantially equal to the first diameter whereas the other one of the first and second electrodes has an opening having a diameter substantially larger than the first diameter, and the first semiconductor layer, the second semiconductor layer, the antenna electrode, the third semiconductor layer, the first electrode and the second electrode are coaxially disposed.

The first conductivity type may be the n-type, whereas the second conductivity type may be the p-type.

The antenna electrode may be made from a high melting point metal.

According to the invention, there is provided a process of fabricating a vertical optical modulator, the process comprising:

a first crystal growth step of epitaxially growing, on a first semiconductor substrate, a first semiconductor layer of a first conductivity type and a second semiconductor layer of a second conductivity type in this order;

a first electrode formation step of forming an antenna electrode on the second semiconductor layer by vapor depositing an electric conductor film on the second semiconductor layer and performing lift-off, the antenna electrode having a plurality of conductive pieces which have a net-like shape as a whole and are separated from one another at the intersections of the net-like shape;

a second crystal growth step of epitaxially growing a third semiconductor layer of a second conductivity type on a second semiconductor substrate;

a substrate fusion bonding step of fusion-bonding the first and second semiconductor substrates by bringing the surface of the first semiconductor substrate on which the first electrode formation step has been performed into close contact with the surface of the second semiconductor substrate on which the second crystal growth step has been performed and by maintaining the first and second semiconductor substrates at 400° C. or more for one or more minutes;

an etching step of removing the second substrate from the product obtained by the fusion bonding; and a second electrode formation step of forming, after the etching step, a first electrode electrically connected to the first semiconductor layer and a second electrode electrically connected to the third semiconductor layer.

According to the invention, there is provided a vertical optical modulator wherein the first semiconductor layers of the first conductivity type, MQW layers having a semi-insulative quantum well structure and the second semiconductor layers of the second conductivity type are repeatedly laminated in this order; a first connecting region of the first conductivity type is formed such that parts of the ends of the repeatedly laminated first semiconductor layers are connected to one another; a second connecting region of the second conductivity type is formed such that parts of the ends of the repeatedly laminated second semiconductor layers are connected to one another; a semi-insulative third connecting region is formed such that the ends of the repeatedly laminated MQW layers are connected to one another and the third connecting region is interposed between the remaining parts of the ends of the first semiconductor layers and the second connecting region and between the remaining parts of the ends of the second semiconductor layers and the first connecting region; a fist electrode is formed in contact with the first connecting region; and a second electrode is formed in contact with the second connecting region.

In a vertical optical modulator according to the invention, a lower contact layer, a cross-band absorption layer having a quantum well structure that includes a hexagonal semiconductor layer, and an upper contact layer are formed on a substrate in this order, and a first electrode and a second electrode are formed so as to be electrically connected to the lower contact layer and the upper contact layer, respectively.

In a vertical optical modulator according to the invention, a cross-band absorption layer having a quantum well structure that includes InP is disposed on a substrate, and a gold dot layer is formed such that gold dots are dispersed on the upper surface of the cross-band absorption layer, and a first electrode and a second electrode are formed so as to be electrically connected to the lower surface and upper surface of the cross-band absorption layer, respectively.

These objects as well as other objects, features and advantages of the invention will become apparent to those skilled in the art from the following description with reference to the accompanying drawings.

BRIEF DESCRIPTION OF THE DRAWINGS

FIG. 1 is views showing a structure of a vertical optical modulator according to a first embodiment of the invention.

FIG. 2 is views showing a structure of a vertical optical modulator according to a second embodiment of the invention.

FIG. 3 is views showing a structure and fabricating process of a vertical optical modulator according to a third embodiment of the invention.

FIG. 4 is views showing a structure of the vertical optical modulator according to the second embodiment of the invention.

FIG. 5 is views showing a structure of a vertical optical modulator according to a fifth embodiment of the invention.

FIG. 7 is views showing a mounting technique for a vertical optical modulator according to the invention.

FIG. 10 is diagrams showing a modulation process which uses a vertical optical modulator according to a fourth or sixth embodiment of the invention.

FIG. 11 is diagrams showing a modulation principle for the vertical optical modulator according to the first embodiment of the invention.

FIG. 13 is views showing a process of fabricating the vertical optical modulator according to the first embodiment of the invention.

FIG. 14 is views showing a modification of the structures of the vertical optical modulators according to the first, second and third embodiments of the invention.

FIG. 16 is views showing a process of fabricating the vertical optical modulator according to the fifth embodiment of the invention.

FIG. 17 is views showing a process of fabricating the vertical optical modulator according to the sixth embodiment of the invention.

DETAILED DESCRIPTION OF PREFERRED EMBODIMENTS

Figure 6:
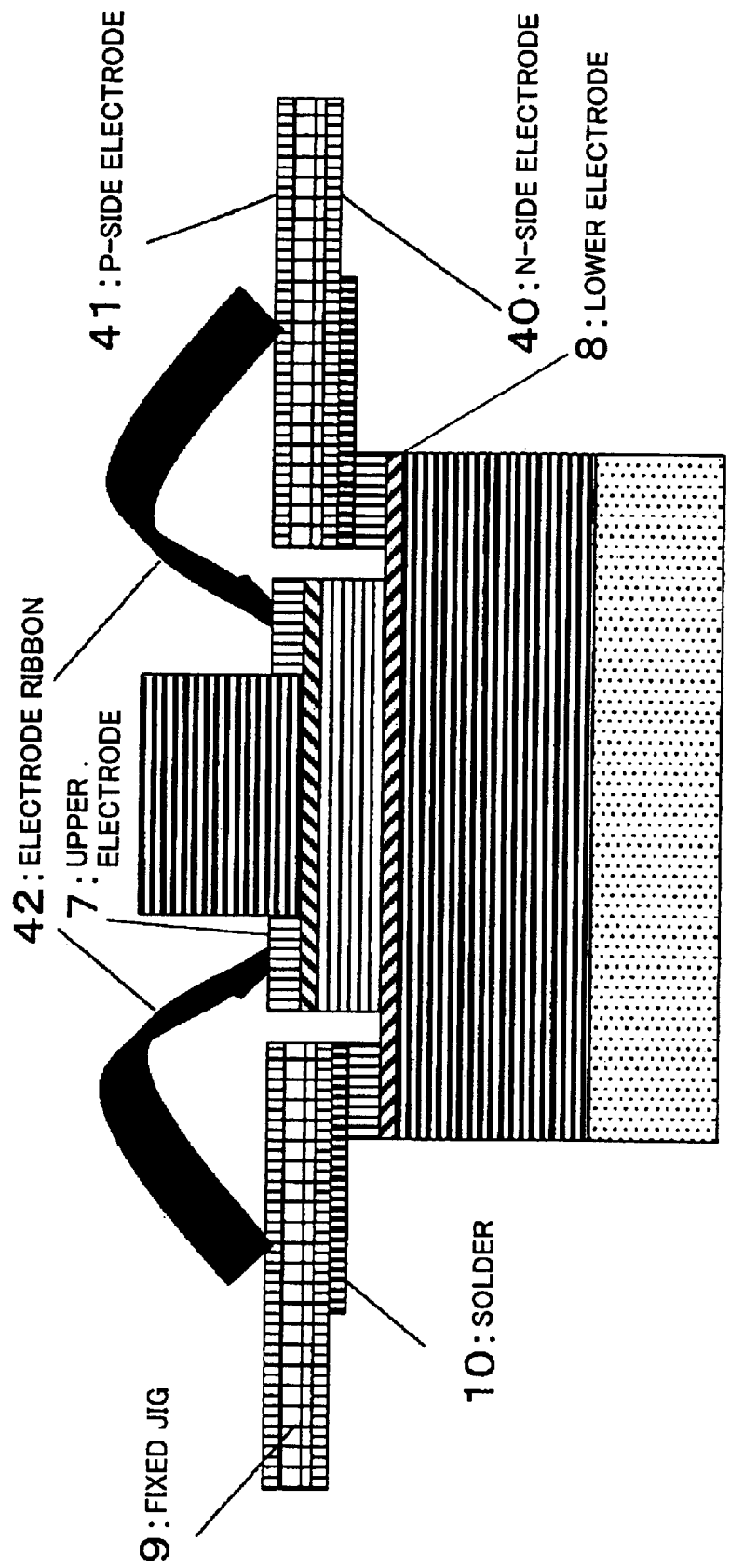
FIG. 6 is a view showing a mounting technique for a vertical optical modulator according to the invention.

Referring now to the accompanying drawings, preferred embodiments of the invention will be described below.

First Embodiment

FIG. 1 shows a vertical optical modulator structure having a refraction index adjusting layer, as a first embodiment of the semiconductor light emitting device of the invention.

A fabricating process, structure and operation of this device will be hereinafter explained. The wavelength of the incident light is set to 1.3 $\mu$m. First, an undoped lower reflective layer 2, an Si-doped n-type InP lower contact layer 3 (100 nm thick), a refraction index adjusting layer 4, a Zn-doped p-type InP upper contact layer 5 (100 nm thick), and an undoped upper reflective layer 6 are epitaxially grown on an n-type InP substrate 1 by the MOVPE method or the like, as shown in FIG. 13($a$). The lower reflective layer 2 and the upper reflective layer 6 respectively have a strain quantum well structure comprised of five pairs of $In_{0.8}Ga_{0.2}P$ layers (thickness=$\lambda$/4, lattice strain=−1%) and $InAs_{0.2}P_{0.8}$ layers (thickness=$\lambda$/4, lattice strain=1%). These layers 2, 6 are undoped and formed without addition of impurities on purpose, in order to restrain valence band absorption and free electron absorption. The refraction index adjusting layer 4 has a strain quantum well structure having eight pairs of undoped InP layers (thickness=10 nm) and undoped $In_{0.9}Ga_{0.1}As_{0.2}P_{0.8}$ layers (thickness=10 nm, lattice strain=−1 to 1%). Then, an $SiO_2$ film 53 is deposited as shown in FIG. 13($b$) and etched into a circular shape, thereby forming an etching mask, and etching is carried out for the upper reflective layer 6 to be cylindrical using the above etching mask and a sulfuric acid based etchant until the upper contact layer 5 is reached. The purpose for this is to form a circular region in which light waves are guided and to make the area of the refraction index adjusting layer 4 as small as possible to increase operation speed. The etching speed for the InAsP layer is fast, while the etching speed for the InGaP layer which constitutes the upper reflective layer is at the same level as the etching speed for the bulk layers of the upper and lower InP layers. However, the actual etching speed of the InGaP layer is faster than that of the InP layers because the InGap layer is thin in film thickness and As is diffused from the InAsP layer. Therefore, etching is selectively stopped at the upper contact layer 5. Thereafter, an $SiO_2$ layer 54 is deposited and etched into a circular shape, thereby making an etching mask, as shown in FIG. 13($c$). With use of this etching mask, the upper contact layer 5 is removed by etching, using a hydrochloric acid based etchant. Subsequently, the refraction index adjusting layer 4 is removed by etching, using a sulfuric acid based etchant. In this case, the InP layer constituting the refraction index adjusting layer 4 is etched by a sulfuric acid based etchant since the layer 4 is as thin as 10 nm and As is diffused from the InGaAsP layer. As a result, etching is selectively stopped at the lower contact layer as shown in FIG. 13($c$). Then, a Cr/Pt/Au electrode is vapor-deposited as an upper electrode 7 and an Au—Sn electrode is vapor-deposited as a lower electrode 8. Then, lift-off is carried out as shown in FIG. 13($d$), thereby obtaining the structure shown in FIG. 1. It should be noted that although the structure of the lower reflective layer 2, the refraction index adjusting layer 4 and the upper reflective layer 6 is not limited to the one described above, it is necessary to make the bandgaps of a barrier layer and a well layer of the quantum well structure of the refraction index adjusting layer 4 smaller than the bandgaps of a barrier layer and a well layer of the quantum well structure of the lower reflective layer 2 and the upper reflective layer 6.

Reference is now made to FIG. 11 to explain the operation of the device. As shown in FIG. 11($a$), the absorption edge wavelength of the refraction index adjusting layer 4 when no voltage is applied is set to 1.28 $\mu$m. In this case, the refraction index (n') is described by (n'=3.2)<(n=3.6). Since the distance of the reflective layer with respect to a light having a wavelength of 1.3 $\mu$m is not represented by d/n=$\lambda$=1.3 $\mu$m (this equation is set to make the thickness (d) of the refraction index adjusting layer equal to the wavelength of light (n$\lambda$)) but is 1.1 $\mu$m, the light is transmitted. On the other hand, the refraction index of the refraction index adjusting layer 4 comprising an InGaAs layer is increased to about 5.0 as shown in FIG. 11($b$) by applying a reverse bias voltage of about 5 V and increasing the wavelength of the absorption edge up to 1.29 $\mu$m, utilizing the Franz-Keldysh effect. As a result, the total refraction index of the multiple films present between the reflective layers 2 and 6 is increased to n=3.6, so that the distance with respect to a light of 1.3 $\mu$m becomes 1.3 $\mu$m with a standing wave formed between the reflective layers 2 and 6 and the light will be reflected at all the area of the reflective layers. Specifically, the spacing between the lower reflective layer 2 and the upper reflective layer 4 becomes optically equal to the wavelength of the signal light. As a result, the light will not be transmitted but reflected. If a higher reverse bias voltage is applied, the spacing between the lower reflective layer 2 and the upper reflective layer 6 becomes longer than the wavelength of the signal light as shown in FIG. 11($c$), so that the light is less likely to be reflected and therefore the intensity of the transmitted light increases. The light signal released in response to an electric signal is indicated by broken line (Type B) in FIG. 10($d$). This apparently indicates such a characteristic that if the light signal is changed from its ON state to its OFF state or vice versa, the light intensity decreases. By defining a start of the electric signal as a change from the OFF state to the ON state, whether the light signal is in the ON state or OFF state can be determined by measuring a pulse which represents that the light signal becomes weak. In this modulation method, even if the rising and falling characteristics of the electric signal deteriorates, the pulse of light is formed as is usual so that sound transmission can be ensured. If the reverse bias to be applied is increased to 10 V or more, optical absorption by the refraction index adjusting layer 4 occurs so that the intensity of the transmitted light further decreases.

If conducting properties are given by doping only the InGaP layers with Si in the n-type reflective layer and with Zn in the p-type reflective layer, the structure and fabricating process of the device can be extremely simplified although valence band absorption and free electron absorption occur more or less. As shown in FIG. 4($a$), the p-type lower reflective layer 2 doped with Zn, the refraction index adjusting layer 4, and the n-type upper reflective layer 6 doped with Si are epitaxially grown on the p-type InP substrate 1 by the MOVPE method or the like. The reason why the n-type is chosen for the upper reflective layer 6 is that the carriers can be fully spread in the case of the n-type so that the entire light receiving region is expected to have uniform characteristics. The lower reflective layer 2 and the upper reflective layer 6 respectively comprise five pairs of InGaP layers (thickness=λ/4) doped with Si or Zn and undoped InAsP layers (thickness=λ/4). The refraction index adjusting layer 4 comprises eight pairs of undoped InP layers (thickness=10 nm) and undoped InGaAsP layers (thickness=10 nm). Thereafter, an $SiO_2$ film is deposited in the light receiving region to be etched into a circular shape, thereby making an etching mask. With this etching mask, etching is carried out using a sulfuric acid based etchant until the lower reflective layer 2 is reached. In this case, since etching cannot be selectively stopped, whether etching has proceeded just before the lower reflective layer 2 is determined by etching time. After an $In_2O_3$ transparent electrode 55 has been formed, an Au—Sn upper electrode 7 is formed and a Cr/Pt/Au lower electrode 8 is formed on the rear face of the substrate by vapor deposition and lift-off. The operation of this device is the same as that of the device having the structure shown in FIG. 1 and an explanation of it will be omitted.

The opening region of the upper electrode 7 of the modulator is circular in shape and light from a fiber is incident on the opening region. The opening region of the upper electrode 7 which transmits this incident light is hereinafter referred to as "light receiving region". The diameter of the upper reflective layer 6 may be equal to the core size of the fiber plus an allowance for a ferrule. In the case of a single mode fiber, the size of the core wire is several μm and, therefore, the diameter of the upper reflective layer 6 may be about 10 μm. The lower electrode 8 is disposed in the vicinity of the refraction index adjusting layer 4, covering the lower contact layer (not shown). The spacing between the lower electrode 8 and the refraction index adjusting layer 4 is preferably 10 μm or less. While light from the fiber is usually incident on the opening region of the upper electrode 7, it is contemplated that the light from the fiber impinges on part of the upper electrode 7 in cases where the core shape of the fiber is large. Therefore, the width of the upper electrode 7 is set to 10 μm or more in order to prevent the light from the fiber from leaking out of the upper electrode 7. However, if the axis of the fiber is out of alignment, light sometimes leaks outwardly from the upper electrode 7. With the intention of reflecting the light at the lower electrode 8 without transmission as much as possible in the above case, the spacing between the lower electrode 8 and the refraction index adjusting layer 4 is set to 10 μm or less.

In the case where the electrode is formed at the underside of the substrate as shown in FIG. 14(a), the inside diameter of the lower electrode 8 is made to be smaller than the outside diameter of the upper electrode 7. In this case, the lower electrode 8 and the upper electrode 7 are made to be overlapped with each other with respect to the direction of incidence such that even if the fiber is out of alignment, the light will not leak out of the upper electrode 7, that is, the light will be reflected at the lower electrode 8 without transmission as much as possible.

There will be hereinafter explained a mounting method for the vertical optical modulator and a structure of a system to which the vertical optical modulator is applied. It should be noted that the mounting method and system structure are described in conjunction with only this embodiment for simplicity, but are equally applicable to all of the following embodiments.

Reference is now made to FIG. 6 for explaining a mounting method for the vertical optical modulator constructed according to the present embodiment. As illustrated in FIG. 6, a solder 10 joined to an n-side electrode 40 of a fixed jig 9 is secured to the lower electrode 8 by soldering. The upper electrode 7 is wire-connected to a p-side electrode 41 of the fixed jig, using an electrode ribbon. Thereafter, as illustrated in FIG. 7(a), the fixed jig 9 wire-connected to an electronic circuit 22 is joined to a connector 23 together with a photodiode 21 by molding. The photodiode is put in operation upon receipt of a light leaking from a fiber 26. By putting a ferrule 25 for supporting the fiber 26 in the connector 23, the locked state shown in FIG. 7(b) is established. The coaxial cable 24 is adjusted to the Ethernet 10 Gbps standard. As illustrated in FIG. 7(b), the fiber 26 is in contact with the vertical optical modulator in such a manner that the fiber 26 and the vertical optical modulator have the same central axis. As a result, the external modulator can be inserted with the same degree of easiness as in the case where fibers are connected using a conventional connector.

On the other hand, it is necessary for a conventional module construction to optically couple the lights coming from two fibers to a waveguide stripe having 1 μm-square cross-section, because the conventional module employs a waveguide modulator 44 as illustrated in FIG. 7(c). Therefore, a lens 43 needs to be inserted at both sides of the modulator (two lenses in total) and the lights need to be narrowed down to be guided into the waveguide. As a result, there arises a need for optical coupling at four points, that is, the fiber 26—the lens 43, the lens 43—the modulator 44, the modulator 44—the lens 43' and the lens 43'—the fiber 26'. It takes several minutes to establish optical coupling at one point and fixing of members such as fibers to the module is necessary, so that the fabrication of the waveguide type modulator requires a lot of man hour. In the case of the vertical optical modulator on the other hand, what is required is only to butt the fiber ends each other as shown in FIG. 7(a), and therefore the vertical optical modulator can be miniaturized and produced at low cost through a less number of fabricating processes, thanks to provision of a modulation region having a size larger than or equal to the size of the core wire of the fiber. In addition, in the event of breakdown, replacement can be carried out simply by removing the fiber.

Figure 8A:
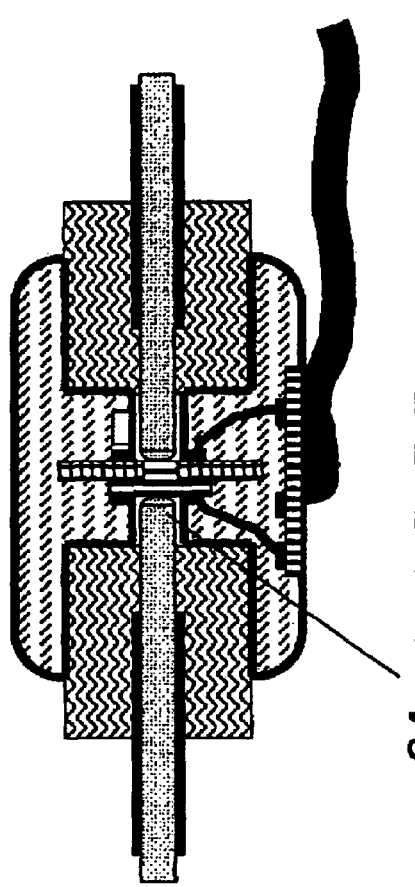
FIG. 8 is views showing a mounting technique for a vertical optical modulator according to the invention.
Figure 8C:
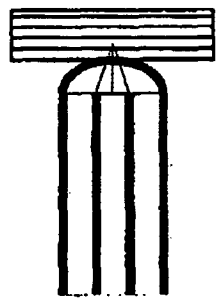
Figure 8B:
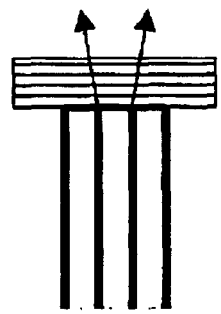

In the case of a multi-mode fiber or plastic fiber, a fiber having a large core size is used. In the case of a plastic fiber for instance, the core size of the fiber is of the order of 100 μm. In this case, if the size of the upper reflective layer is set to 100 μm, the area of the modulator must be increased, resulting in an increase in the parasitic capacitance of the modulator. By use of a tapered fiber as illustrated in FIG. 8(a), the light can be narrowed down as shown in FIG. 8(c) from the state shown in FIG. 8(b) in which the light coming out of the fiber shown in FIG. 7 is going just as it is, so that the light receiving area of the modulator can be reduced with a reduction in the capacity, which enables high-speed operation. If the light receiving area of the modulator is size of 50 μm or less, operation of 10 Gbps or more can be attained. If the light receiving region is out of alignment with the upper reflective layer, the light will be transmitted. Therefore, the surface of the device is substantially entirely covered with an electrode metal as shown in FIG. 1(b), thereby shutting off transmitted light from other parts than the upper reflective layer.

In the operation of the modulator of the present embodiment, when no voltage is applied, the modulator is in its ON state and when a voltage of 5V or more is applied, the modulator is brought into its OFF state. In this modulation method, the refraction index adjusting layer does not absorb light and therefore generation/disappearance of electric charge does not occur so that high-speed switching independent of the speed of the carriers becomes possible. As a result, a transmission with an open eye pattern becomes possible at a rate of 10 Gbps.

Figure 18:
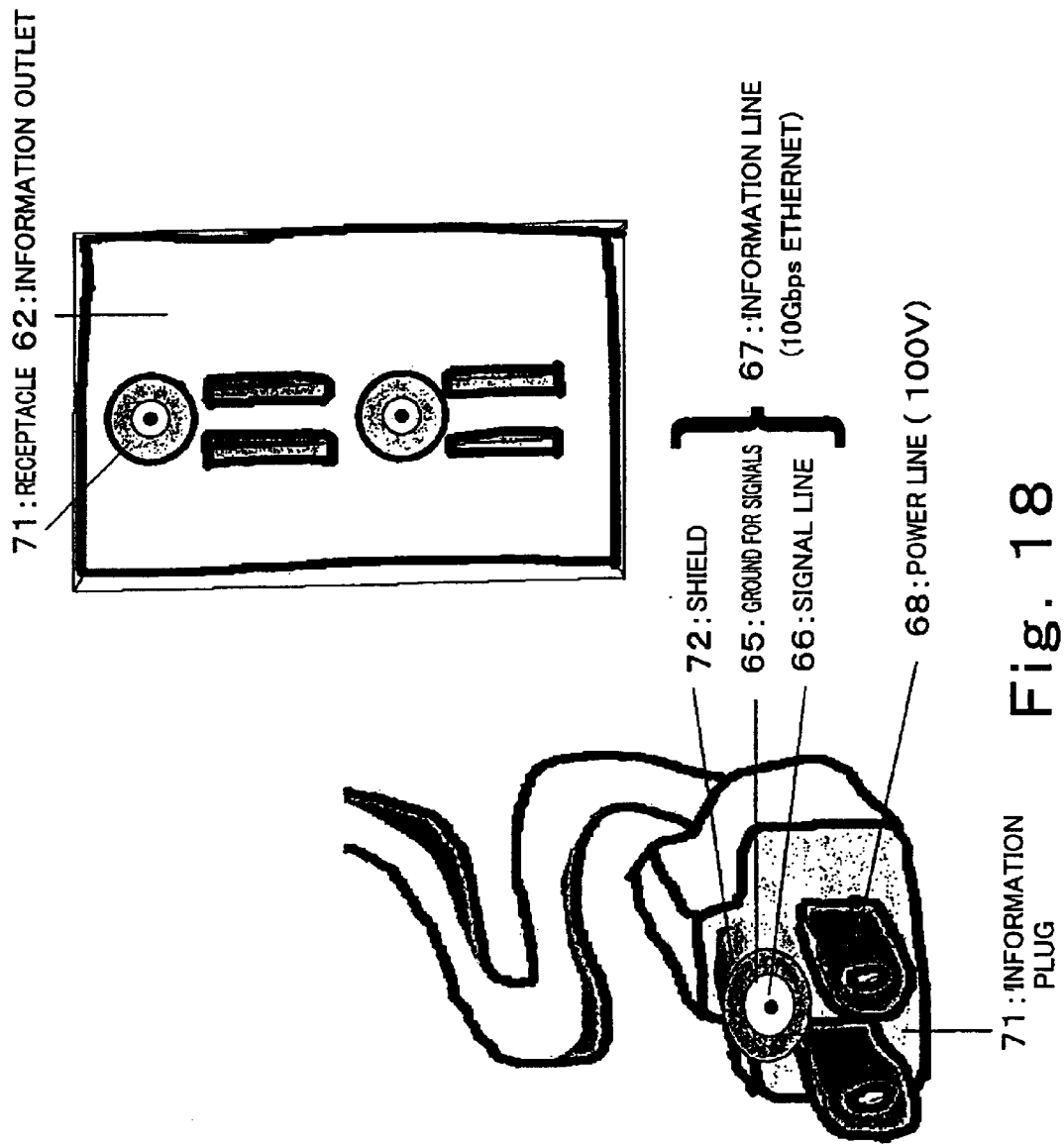
FIG. 18 is a view showing a structure of an information outlet to which the vertical optical modulator of the invention is applied.

FIG. 18 shows a structure of an information outlet constructed according to the present embodiment. In the information outlet 62, a receptacle 72 for an information line (10 Gbps ethernet connector) 67 is disposed above each receptacle for household use. Herein, an information plug 71 having the information line 67 incorporated therein is used for connecting a connector for a power supply line (100V) 68 as well as the information line 67. The information line 67 is composed of a shield 72, a ground 65 for signals, and a signal line 66. The conventional earth line is similar to the shield line. An optical signal is converted into an electric signal to be directly transmitted to the apparatus through a cable having one core wire. Therefore, two-way transmission such as made by twisted pair cables is not performed herein.

Figure 9:
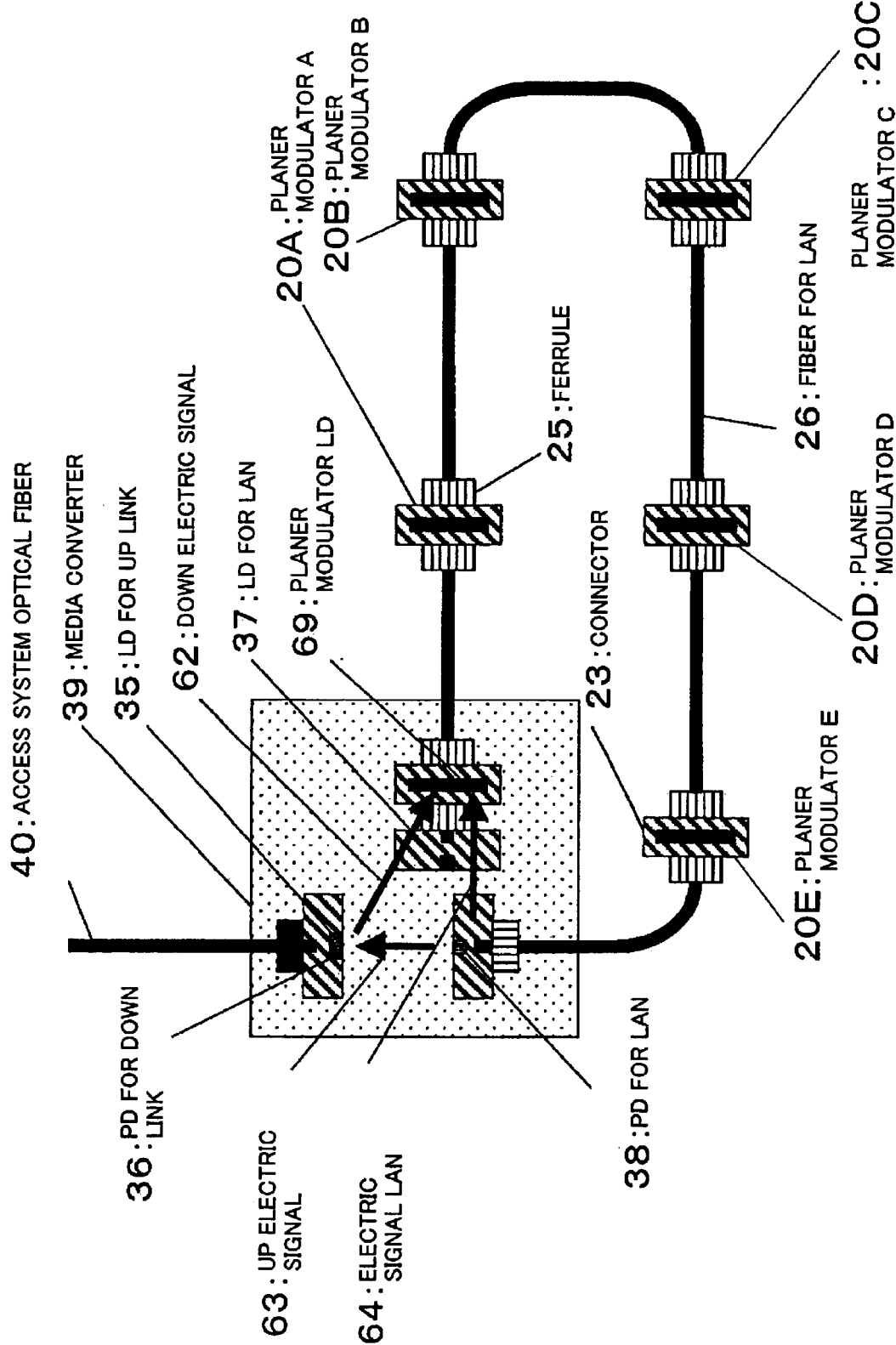
FIG. 9 is a view showing a system to which the vertical optical modulator of the invention is applied.
Figure 12:
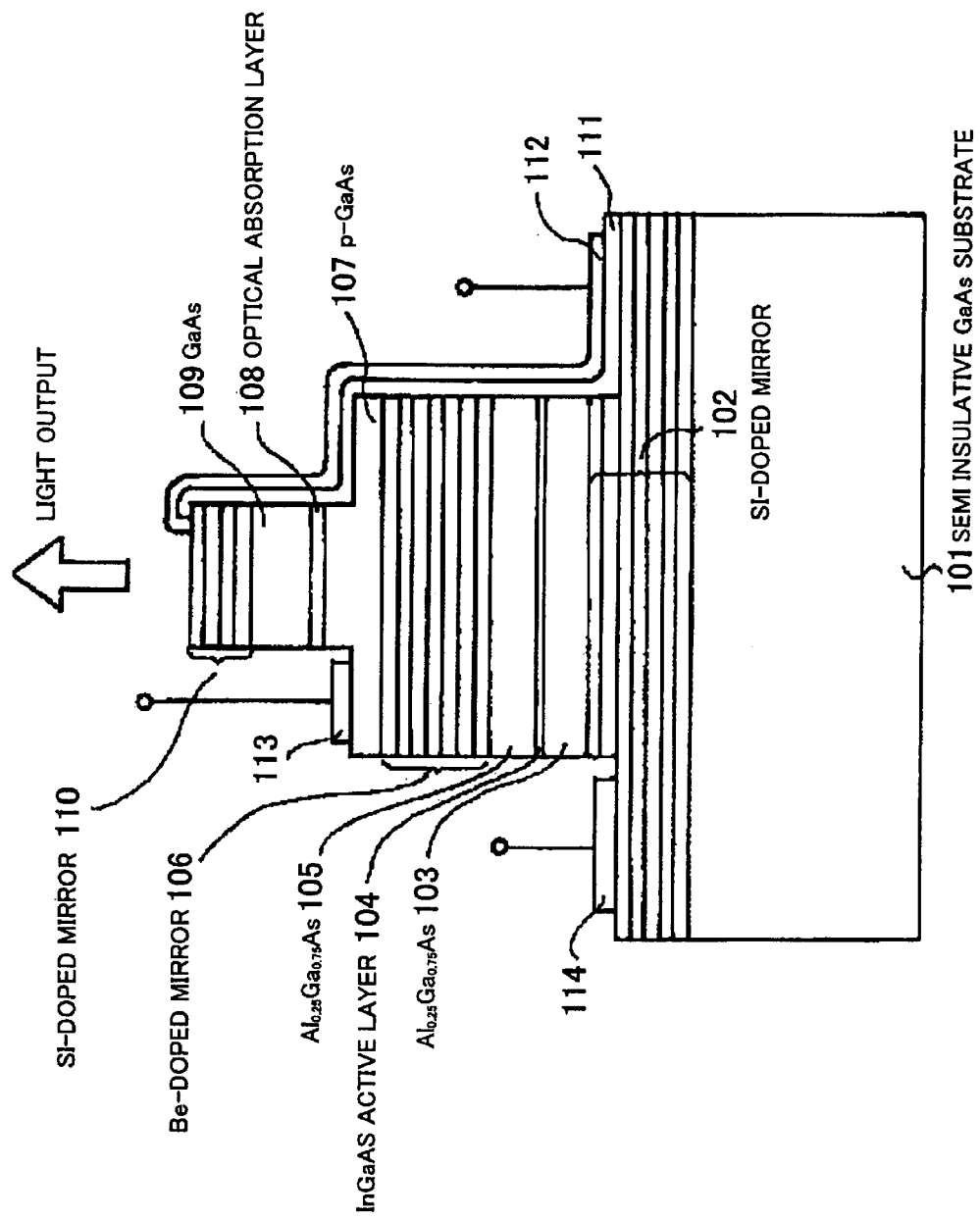
FIG. 12 is a view showing a structure of a prior art vertical optical modulator.

FIG. 9 illustrates an optical transmission system to which is applied the modulator of the present embodiment. An optical signal transmitted from a station of the carriers through an access system optical fiber (single mode fiber) 40 is once received by a PD for down link 36 to be converted into a down electric signal 62. With this down electric signal, a vertical optical modulator LD 69 is modulated. Herein, a 1.3 μm semiconductor laser of the edge emission type is used to be DC driven. For transmitting a down signal to each apparatus, all vertical optical modulators other than the vertical optical modulator LD 69 are set in their ON (transparent) state and the down (optical) signal is received by the photodiode 21 (FIG. 7) housed in each connector to be supplied as an electric signal to each apparatus through a 10 Gbps ethernet co-axial cable 24 (FIG. 7). Since a higher transmission rate for down signals is about 1 Gbps, a transmission carried out at a rate of 10 Gbps within LAN offers an ample room for additional data. This spare time is utilized for the transmission between the connectors. Specifically, if no down signal is transferred, a vertical optical modulator 20A modulates a DC light and its signal is received by the light receiving element of a vertical optical modulator 20D, while the vertical optical modulator LD69 being kept in its ON state. On the other hand, when transmitting a signal from the vertical optical modulator 20D to the vertical optical modulator 20A, the light is once received by a PD for LAN 38 and converted into an electric signal LAN64 to be stored. Thereafter, the vertical optical modulator LD69 is modulated to transmit a signal, utilizing the gap between down signals and, then, the signal is received by the vertical optical modulator A. For transferring an optical signal outwardly from the LAN, an LD for up link is modulated by an electric signal 63 which has been converted by the PD for LAN 38. The present system is characterized by the optical fiber in the form of a loop. As a result, the number of light emitting devices to be used is only one, which increases the reliability of the system. In addition, the cost of the system can be reduced by use of the vertical optical modulator which is less expensive than lasers. Further, not only a laser but also a less expensive light emitting diode can be used as the light emitting device. The reason for this is that, in a light emitting diode, light intensity is proportional to light emitting area. Therefore, a signal light having higher intensity can be modulated by a vertical optical modulator having larger area. Since the vertical optical modulator is of a connector type, replacement and addition of elements can be readily carried out and failure mode analysis is facilitated. In addition, by virtue of the loop form, not only can the transmission between the connectors be easily carried out but also the need for optical switches can be obviated to reduce the cost of the media converter. Further, since the modulator has such a structure that transmitted light can be shut off by covering the surface or rear face with an electrode, a POF fiber having a large diameter can be used.

Second Embodiment

FIG. 2 shows a structure of a modulator constructed according to a second embodiment of the invention. A structure and operation of the device will be described below.

As shown in FIGS. 2(a) and 2(b), the modulator of the second embodiment comprises a substrate 1. Disposed on the substrate 1 is an n-type semiconductor layer 33 (hereinafter abbreviated as "n-type layer 33") on which a p-type semiconductor layer 31 (hereinafter abbreviated as "p-type layer 31") and a lower electrode 8 are formed. The lower electrode 8 has, at the center, a circular opening and is formed on the n-type layer 33. The p-type layer 31 has the planer configuration of a circle having a slightly smaller diameter than the inside diameter of the opening of the lower electrode 8. The p-type layer 31 is formed within and coaxially with the opening of the lower electrode 8. Accordingly, there is a certain gap between the p-type layer 31 and the lower electrode 8. A p-type semiconductor layer 46 (hereinafter abbreviated as "p-type layer 46") is disposed on the p-type layer 31 with an antenna electrode 32 between. Accordingly, there is an air gap 111 between the p-type layers 31 and 46. The p-type layer 46 and the antenna electrode 32 have the planer configuration of a circle having the same diameter as the p-type layer 31 and are disposed coaxially with the p-type layer 31. As illustrated in FIG. 2(d), the antenna electrode 32 has, in plan, the form of a net from which intersections 102 are cut away. More specifically, the antenna electrode 32 is designed such that nodes (conductive pieces) 101 are separated from one another at the phantom intersections 102 of the net shape and disposed so as to assume the shape of a net as a whole. This net has square meshes and therefore the nodes 101 takes the form of a lattice as a whole. The width W2 of the nodes 101 is set to about λ/3 and the spacing W1 between the nodes in a widthwise direction is set to about λ, where the wavelength of the signal light is λ. Herein, the wavelength λ of the signal light (incident light) is 1.5 μm.

As illustrated in FIGS. 2(a) and 2(b), an upper electrode 7 is formed on the p-type layer 46. The upper electrode 7 has the planer configuration of a circular ring having the same outside diameter as the p-type layer 46 and is disposed coaxially with the p-type layer 46. The substrate 1, the n-type layer 33, the p-type layer 31, and the p-type layer 46 are formed from a light transmissive material, whereas the lower electrode 8 and the upper electrode 7 are formed from a light untransmissive material. A signal light enters the lower surface of the substrate 1 and goes out of the upper surface of the p-type layer 46.

A fabricating process for the modulator of the above structure will be described.

Referring to FIGS. 2(a) and 2(d), an n-type GaAs layer 33 (thickness=200 nm) doped with Si and a p-type GaAs layer 31 (thickness=10 nm) are epitaxially grown on the semi-insulative GaAs substrate 1 by the MOVPE method or the like. Thereafter, the antenna 32 as shown in FIG. 2(d) is formed. As the metal constituting the antenna 32, W is used but other metals may be used as far as they are high melting point metals. Thereafter, a p-type GaAs layer 46 grown on another GaAs substrate is fusion bonded to the p-type GaAs layer 31 through the antenna electrode 32 by holding the p-type GaAs layer 46 and the p-type GaAs layer 31 in an atmosphere of nitrogen containing hydrogen for one or more minutes, with their surfaces being in close contact with each other. The fusion bonding temperature at that time is lower than the temperature at which fusion bonding of a crystal is usually carried out. This is thought to be attributable to the fact that since the fusion is carried out through the antenna electrode 32 made from W, the fusion reaction occurs even at a low temperature owing to the catalysis of the metal. Herein, the two p-type layers are separated from each other with a spacing 111 between as shown in FIG. 2(a). As a result, light is propagated within air having a refraction index (n) of 1 in the region 111 in which the antenna electrode 32 functions as an antenna, so that the electrode gap which is normally $\lambda/n$ becomes $\lambda$ and, in consequence, the process is facilitated.

Then, the p-type layers 46 and 31 are etched into a short cylindrical shape, using a $SiO_2$ film as a mask, for the purpose of forming a circular light receiving region into which optical waves are guided and making the area of the interface of a pn junction 204 as small as possible to increase operation speed. Finally, the upper electrode 7 made from Cr/Pt/Au is vapor deposited on the p-type layer 46, followed by lift-off, whereas the lower electrode 8 made from Au/Ge is vapor deposited on the n-type layer 33, followed by lift-off, whereby the structure shown in FIG. 2(a) is obtained.

Next, there will be explained the operation of the modulator having the above structure and fabricated in the above process.

Referring to FIG. 2(c), a depletion layer 203 is formed on both sides of the pn junction 204 between the p-type layer 31 and the n-type layer 33 (hereinafter referred to as "pn junction"). This depletion layer 203 is formed in an extremely narrow region (not shown) which straddles the pn junction 204, when no voltage is applied between the upper electrode 7 and the lower electrode 8. In this condition, the nodes 101 of the antenna electrode 32 (see FIG. 2(d)) are conductive to one another through the p-type layers 31 and 46 so that the antenna electrode 32 functions as an antenna. Therefore, a signal light which has entered from the lower surface of the substrate 1 and is passing through the air gap 111 is reflected at the antenna electrode 32 because it is an electromagnetic wave. As a result, the amount of transmitted light in the modulator decreases.

On the other hand, if a voltage (hereinafter referred to as "reverse bias voltage") which reversely biases the pn junction 204 is applied between the upper electrode 7 and the lower electrode 8, the depletion layer 203 spreads over a region which is located at both sides of the pn junction 204 within the p-type layer 31 and the n-type layer 33. The n-type layer 33 made from GaAs is doped so as to have an impurity concentration of $10^{18}$ $cm^{-3}$, whereas the p-type layers 31, 46 made from GaAs are doped so as to have an impurity concentration of $2\times10^{17}$ $cm^{-3}$, so that the depletion layer 203 largely spreads toward the p-type layers 31, 46 which have lower impurity concentration. For this reason, FIG. 2(c) shows only the depletion layer 203 on the side of the p-type layers 31, 46. The depletion layer 203 extends from the p-type layer 31 to the p-type layer 46 by way of the antenna electrode 32. In this condition, the nodes 101 of the antenna electrode 32 (see FIG. 2(d)) are not conductive to one another because the intersections 102 are depleted, so that the antenna electrode 32 does not function as an antenna since it cannot affect the phase of the electromagnetic wave.

Therefore, the signal light passing through the air gap 111 will not be reflected and in consequence, the amount of transmitted light in the modulator increases.

This device accordingly functions as a modulator, since the amount of transmitted signal light is reduced and increased by turning the reverse bias voltage between the upper electrode 7 and the lower electrode 8 ON and OFF.

When a reverse bias voltage of 2 V is applied, the depletion layer 203 extends over the range of 100 nm from the pn junction 204 so that the p-type layer 31 is completely depleted as shown in FIG. 2(c) and the p-type layer 46 is partly depleted. Therefore, the reverse bias voltage to be applied should be 2 V or more.

As described earlier, the modulator of the present embodiment is in its OFF (reflection) state with no voltage applied and brought into its ON (transmission) state by application of a voltage of 2 V or more. Specifically, when the modulator is in the OFF state, incident light is reflected, reducing the amount of output light so that high output intensity can be attained during the ON state. Since the operation speed of this modulator is only dependent on the moving speed of the depletion layer 203 at the time of ON/OFF operation, an operation speed of 10 Gbps or more can be easily attained.

In this modulator, if the wavelength of the signal light is more than or equal to the spacing ($W1=\lambda$ or more) of the antenna electrode 32 in a widthwise direction, the signal light is entirely reflected. Therefore, a modulator independent of wavelength can be obtained.

FIG. 14(b) is a sectional view showing a modification of the present embodiment.

In this embodiment, if loss caused by free electrons is permitted, an electrically conductive substrate, e.g., an n-type GaAs substrate may be used as the substrate 1 instead of the semi-conductive GaAs substrate. In this case, the lower electrode 8 may be disposed at the underside of the substrate 1 as shown in FIG. 14(b).

While the antenna electrode 32 is in the form of a net having square meshes in the present embodiment, the meshes may have other desired shapes.

The material of the antenna electrode 32 is not limited to metals but may be any kinds as far as they are electrically conductive. For instance, a semiconductor material may be used which is doped with impurities so as to have conducting properties.

The medium surrounding the antenna electrode may be constituted by other dielectric substances than air. More concretely, a dielectric layer may be provided in place of the air gap 111 shown in FIG. 2(a) with the antenna electrode 32 being disposed therein. In this case, the refractive index n of the dielectric layer is preferably approximate to 1 in order to widen the node spacing of the antenna electrode 32.

The substrate 1 may be constituted by InP. In this case, it has high pressure resistance.

The structure may be arranged such that a p-type layer is formed on the substrate 1 and an n-type layer including an antenna electrode is formed on the p-type layer.

Another alternate is such that the p-type layers 31 and 46 are integrally formed, the n-type layer 33 is split into two in a thickness-wise direction, and the air gap 111 and the antenna electrode 32 are disposed between the two split portions.

Third Embodiment

FIG. 3(a) shows a structure of a modulator constructed according to a third embodiment of the invention. A fabrication process and structure of the device will be described below. The wavelength of the incident light is set to 1.3 μm. As illustrated in FIG. 3(b), an nipi structure is repeatedly, epitaxially grown on a semi-insulative GaAs substrate 1 by the MOVPE method or the like. The nipi structure is formed by repeatedly growing (i) n-type AlGaAs layers 12 (thickness=103 nm) doped with Si, (ii) 10 semi-insulative GaAs/AlGaAs-MQW layers (5 nm+5 nm) 14 to which a carrier killer dopant is added, (iii) p-type AlGaAs layers 13 doped with Mg (thickness=103 nm), and (iv) semi-insulative MQW layers 14. The Al composition of the n-type AlGaAs layers 12 and the p-type AlGaAs layers 13 is the same as the average Al composition of the semi-insulative GaAs/AlGaAs-MQW layers 14. The sum of the thickness of the AlGaAs layers 13 and the thickness of the semi-insulative MQW layers 14 is set to λ/2.

Thereafter, both side faces are removed by etching as shown in FIG. 3(c). At the respective side faces, an n-type heavily doped layer 49, an n-type lightly doped layer 50, a p-type lightly doped layer 51 and a p-type heavily doped layer 52 are formed by diffusion or ion implantation as shown in FIG. 3(d). As a result, there are formed, in the heavily doped region, an n-type region 47 and a p-type region 48 which are of the same conductivity types as their originals. In the lightly doped region, the region having the same conductivity type as that of the dopant is kept to have that conductivity type whereas the region having a conductivity type opposite to that of the dopant becomes co-doped, forming a high resistance region (semi-insulative connection region 201). In the semi-insulative crystalline region, the carriers are killed by the carrier killer dopant so that semi-insulating properties are maintained. As a result, all the n-type layers are linked to the n-type region while all the p-type layers being linked to the p-type region and the n-type layers are separated and insulated from the p-type region by the semi-insulative MQW layer. Thus, the structure shown in FIG. 3(a) is formed.

In the condition in which loss caused by free electrons is permitted, an n-type GaAs substrate for example can be used as a conductive substrate. Consequently, it becomes possible to dispose a lower electrode having a circular transmitting region at the underside of the substrate as shown in FIG. 14(c).

The operation of this device will be described below. When no voltage is applied, the n-type AlGaAs layers 12, the p-type AlGaAs layers 13 and the semi-insulative MQW layers 14 have the same average Al composition so that refraction index does not vary and light is not reflected because these layers are regarded as the same substance for the light. By applying a reverse bias voltage between an n-type electrode 15 and a p-type electrode 16, an electric field is impressed to the semi-insulative MQW layers 14 and only the refraction index of the semi-insulative MQW layers 14 increases owing to the quantum confining effect so that a cyclic structure emerges, acting as a reflective layer. As a result, the incident light is reflected, leading to a decrease in the amount of transmitted light so that the device functions as an external modulator. The principle of the operation in this case resides on the development of an electric field in the semi-insulative MQW layers 14, and light is not absorbed so that no carriers are generated. As a result, when the modulator is OFF, the incident light is reflected, causing a decrease in the amount of output light, so that high output intensity can be attained at the time of the ON state. In addition, the same speed (i.e., 10 Gbps or more) as the moving speed of the depletion layer can be obtained for the operation of the device.

It should be noted that the n-type layers 12 and the p-type layers 13 may comprise InGaAsP whereas the semi-insulative MQW layers 14 may comprise InP/InGaAsP-MQW. In this case, the composition ratio of GaAs in the n-type layers 12, the p-type layers 13 and the semi-insulative MQW layers 14 should be constant. In addition, it is required that the ratio of Ga to As be 1:2.

Fourth Embodiment

FIG. 4(a) shows a structure of a modulator constructed according to a fourth embodiment of the invention. A fabricating process and structure of this device will be described below. The wavelength of the incident light is set to 1.3 μm. After growing a GaN low-temperature buffer layer (not shown) on a sapphire substrate 1, an n-type GaN lower contact layer 3 (thickness=4 μm) doped with Si at $2\times10^{18}$ cm$^{-3}$, an $Al_{0.5}Ga_{0.5}/In_{0.1}Ga_{0.9}N$ interband absorption layer 17, and a p-type GaN upper contact layer 5 (thickness=500 nm) doped with Mg are epitaxially grown by the MOVPE method as shown in FIG. 4(a). The interband absorption layer 17 is composed of 5 layers and formed by repeatedly growing AlGaN barrier layers (thickness=3 nm) doped with Si at $5\times10^{18}$ cm$^{-3}$ and InGaN well layers (thickness=2 nm) doped with Si at $5\times10^{17}$ cm$^{-3}$. Thereafter, an Ni (thickness=5 nm)/Au (thickness=10 nm) upper transparent electrode 7 is vapor deposited on the entire surface. Then, upper transparent electrode 7, the upper contact layer 5 and the interband absorption layer 17 are removed by chlorine dry etching after the upper transparent electrode 7 is spattered, using an $SiO_2$ film as a mask. Further, an Al/Pt/Au lower electrode 8 is vapor deposited to obtain the structure shown in FIG. 4(a).

In the condition in which loss caused by free electrons is permitted, use of an n-type GaN substrate or n-type SiC substrate as the conductive substrate 1 becomes possible. As a result, the lower electrode 8 may be disposed at the underside of the substrate as shown in FIG. 4(b).

Next, the operation of this device will be described. As shown in FIG. 4(c), with no voltage applied, the band discontinuity quantity of the conducting band is about 1.5 eV. At that time, a primary energy state E1 is about 0.3 eV upper than the well layers. Herein, the piezoelectric field of the well layers is 6.5 MV/cm and the piezoelectric field of the barrier layers is −6.5 MV/cm. Since a secondary energy state E2 is 1.2 eV upper than the well layers, the wavelength of light to be absorbed is about 1.37 μm so that light having a wavelength of 1.3 μm is absorbed. On the other hand, when a voltage of 5 V is applied between the electrodes 7, 8 as shown in FIG. 4(d), an electric field of 1 V is impressed to each well layer so that the thickness of the well layers becomes ½ equivalently and the primary energy state E1 becomes 0.4 eV. The secondary energy state E2 becomes 1.4 V, increasing closely to the level of the barrier layers. As a result, the wavelength of light to be absorbed is shortened to about 1.24 μm and light having a wavelength of 1.3 μm is transmitted. Herein, the interband energy difference when no voltage is applied is 1.37 μm, but the light does not resonate with the band, so that it is not absorbed. Therefore, by applying a voltage of 2.5 V to make the interband energy equal to the energy of light, light having a wavelength of 1.3 μm is absorbed at the well layers as shown in FIG. 10(b). In this case, light is modulated so as to have the intensity indicated by broken line (Type B) in FIG. 10(d). Since the half band width of the absorption spectrum is about 30 meV, a satisfactory extinction ratio can be obtained by spectrum shift caused by application of a voltage of 2.5 V. In the case of the interband absorption, the carriers lose energy within the conducting band so that the life of the carriers becomes extremely short and high speed operation becomes possible unlike the electric field absorption type.

Fifth Embodiment

FIG. 5(a) shows a structure of a modulator constructed according to a fifth embodiment. A fabricating process and structure of this device will be described below. The wavelength of the incident light is set to 1.3 μm. As shown in FIG. 16(a), an n-type InP lower contact layer 3 (thickness=100 nm) doped with Si, an undoped depletion region adjusting layer 74, and a p-type InP upper contact layer 5 (thickness=100 nm) doped with Zn are epitaxially grown on a semi-insulative InP substrate 1 by the MOVPE method or the like. The depletion region adjusting layer 74 is composed of 5 pairs of undoped InP layers (thickness=10 nm) and undoped InGaAsP layers (thickness=5 nm). Then, an SiO$_2$ film is deposited as shown in FIG. 16(b) and etched into a circular shape to form an etching mask 53. After the part of the InP upper contact layer 5 outside the upper electrode 7 is removed by etching with the etching mask 53 and a hydrochloric acid based etchant, etching is further carried out with a sulfuric acid based etchant until the lower contact layer 3 is reached. Herein, the depletion region adjusting layer 74 is selectively etched and this etching is stopped at the lower contact layer 3 as described earlier in the fist embodiment. Thereafter, as shown in FIG. 16(c), an SiO$_2$ film 54 is further deposited, forming an etching mask for the light receiving region, and by use of this etching mask and a hydrochloric acid based etchant, the upper contact layer in the light receiving region is removed by etching. Subsequently, a plurality of gold dots 19 having a diameter of 2 nm are disposed at about 200 nm intervals in the light receiving region and the upper part is protected by SiO$_2$, as shown in FIG. 16(d). A process of forming the gold dots 19 will be hereinafter described. First, the surface of the undoped depletion region adjusting layer in the light receiving region is immersed into a 5% solution of silane coupling material (APTES) etc. An Au colloid solution is dropped onto the surface and the surface is allowed to stand for about one hour. After removal of the Au colloid solution, washing with water and drying are carried out, followed by baking at 100° C. Then, cleaning with an oxygen plasma is done at 60° C. and 60 W for 10 minutes to remove organic substances from the surface. Thereafter, SiO$_2$ is deposited at 320° C., using a plasma CVD. Since the Au dots 19 having a diameter of 2 nm are formed, pH is set to 8 to 9 in order to obtain a concentration of $2.5 \times 10^9$ cm$^2$. Where the Au dots 19 have a diameter of 5 nm, pH is about 9 to 10. The spacing between the gold dots formed on the surface needs to be shorter than the wavelength of the absorbed light within the depletion region adjusting layer 74. Herein, the refraction index of the depletion region adjusting layer 74 is set to 3.2 and the spacing between the gold dots 19 is set to 400 nm or less. A Cr/Pt/Au electrode and an Au—Sn electrode are vapor deposited as the upper electrode 7 and the lower electrode 8 respectively, and lift-off is done as shown in FIG. 16(d) thereby obtaining the structure shown in FIG. 5(a).

Hereinafter, the operation of this device will be explained. With no voltage applied, the undoped depletion region adjusting layer 74 is of the n-type of about $10^{17}$ cm$^{-3}$ and therefore plasmons are not generated. On the other hand, with a voltage applied to the depletion adjusting layer 74, the depletion region adjusting layer 74 is depleted so that plasmons are generated in the region corresponding to the gold dots 19 within the depletion region adjusting layer 74, as shown in FIG. 5(c). In the area where plasmons are generated (i.e., a plasmon generating region 58), the refraction index increases so that light is absorbed, resonating with the modulation cycle of the refraction index.

If the substrate 1 is electrically conductive, the structure and fabricating process of the device are significantly simplified as shown in FIG. 5(b), although valence electron absorption or free electron absorption occurs more or less. The undoped depletion region adjusting layer 74 and the Zn-doped, p-type InP upper contact layer 5 (thickness=100 nm) are epitaxially grown by the MOVPE method. Then, an SiO$_2$ film is deposited as shown in FIG. 16(b) and etched into a circular shape to form the etching mask 53. After the part of the InP upper contact layer 5 outside the upper electrode 7 is removed by etching with the etching mask 53 and a hydrochloric acid based etchant, etching is selectively carried out using a sulfuric acid based etchant until the substrate 1 is reached. Thereafter, the same process as shown in FIG. 16 is performed and finally, the lower electrode 8 is vapor deposited on the underside of the substrate and lift-off is performed, thereby forming the lower electrode 8. The explanation of the operation is similar to that of the structure shown in FIG. 5(a) and therefore will be omitted herein.

Sixth Embodiment

Figure 15A:
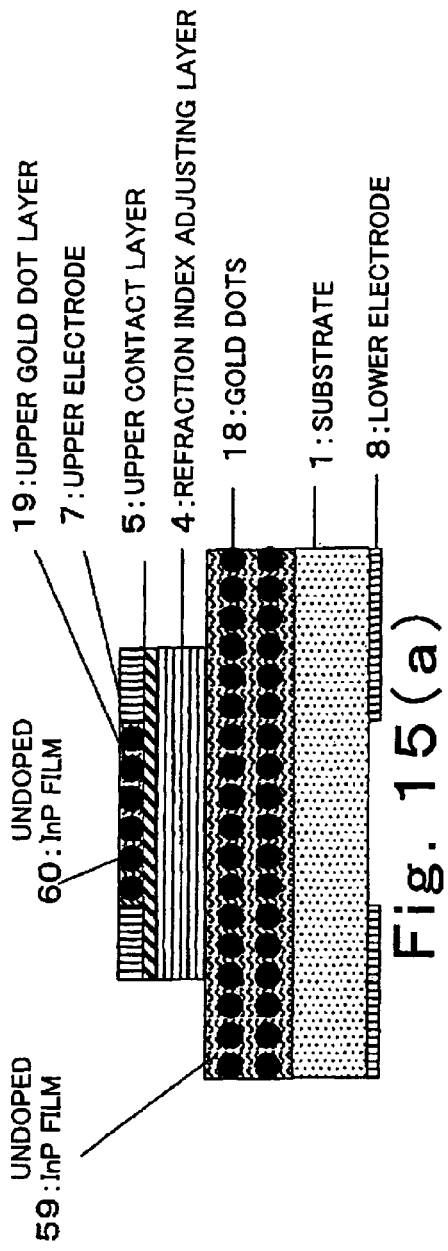
FIG. 15 is views showing a structure of the vertical optical modulator according to the sixth embodiment of the invention.
Figure 15B:
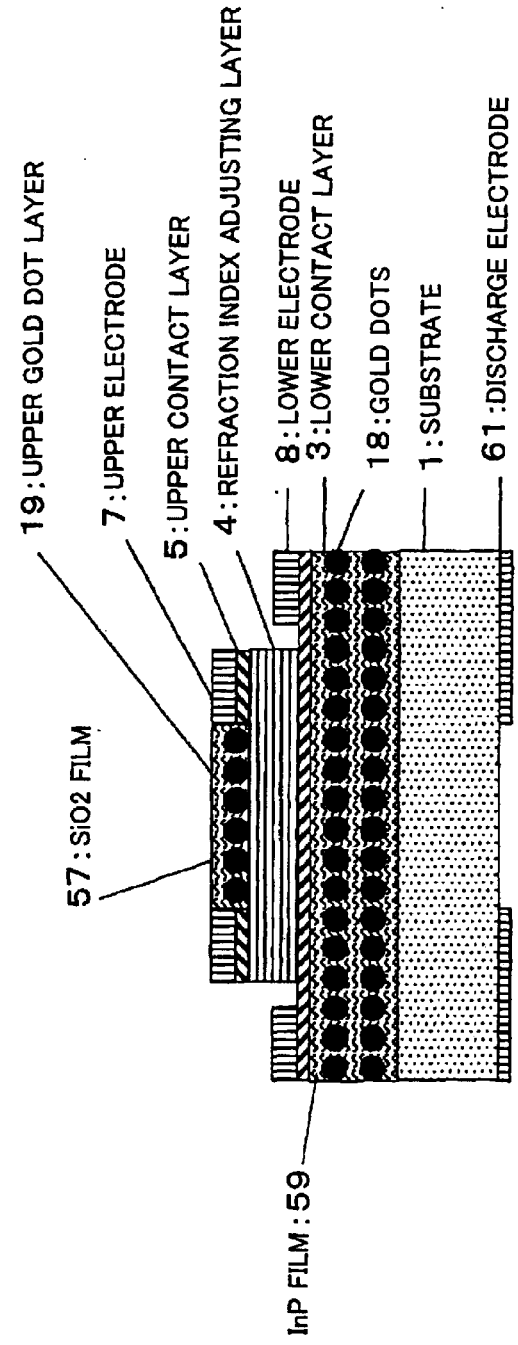

FIG. 15(a) shows a structure of a modulator constructed according to a six embodiment of the invention. A fabricating process and structure of this device will be described below. The wavelength of the incident light is set to 1.3 μm. As shown in FIG. 17(a), a plurality of lower gold dots 18 having a diameter of 2 nm are deposited on an n-type InP substrate 1 at 10 to 30 nm intervals and an InP layer 59 is also deposited by spattering to form a layer having a thickness of 100 nm which corresponds λ/4. Further, lower gold dots 18' are deposited and an InP layer 59' is deposited by spattering to form a λ/4-thick layer, thereby obtaining the structure shown in FIG. 17(b). Although the two InP layers are intentionally undoped herein, this embodiment is intended for a discharge from the lower gold dots 18 and therefore n-type conductivity at about $5 \times 10^{17}$ cm$^{-3}$ is set as a deposit condition for the InP layers. As shown in FIG. 17(c), a p-type InP layer 5 (thickness=100 nm) doped with Zn and serving as an upper contact layer and an undoped refraction index adjusting layer 4 are sequentially grown on another InP substrate 58. The refraction index adjusting layer 4 is composed of 8-cycles of undoped InP layers (thickness=10 nm) and undoped InGaAsP layers (thickness=10 nm). Then, the substrate shown in FIG. 17(c) is turned upside down to be brought into contact with the substrate shown in FIG. 17(b). These substrates are heated in an atmosphere of hydrogen at 400° C. to be fusion bonded. As a result, the structure shown in FIG. 17(d) is obtained. After the substrate 58 has been removed by mechanochemical polishing and etching with a hydrochloric acid based etchant, an SiO$_2$ film 53 is deposited as shown in FIG. 17(e) and etched into a circular shape to form an etching mask. After the part of the InP upper contact layer 5 outside the upper electrode 7 has been removed by etching with this etching mask and a hydrochloric acid based etchant, etching by use of a sulfuric acid based etchant is carried out until the undoped InP film 59' is reached. In this embodiment, the refraction index adjusting layer 4 is selectively etched and this etching is stopped at the undoped InP film, as has been discussed in the first embodiment. Thereafter, upper gold dots 19 are deposited in the light receiving region and covered with an undoped InP film 60. The process of forming the upper gold dots 19 is similar to that of the fifth embodiment except that after cleaning by use of an oxygen plasma is done at 60° C. and 60W for 10 minutes to remove organic substances on the surface, InP is deposited by spattering at room temperature. In this embodiment, since Au dots having a diameter of 2 nm are used, pH is set to 5 to 7 in order to obtain $2.5 \times 10^{11}$ cm$^2$. Where the Au dots have a diameter of 5 nm, pH is about 2 to 3. The spacing between the lower gold dots 18' and the upper gold dots 19 is 360 nm which corresponds to light having a wavelength of 1.3 μm. A deposit condition for the undoped InP film 60 is n-type conductivity at about $5 \times 10^{17}$ cm$^{-3}$ with the intention of causing a discharge from the gold dots. In this way, the structure shown in FIG. 15(*a*) is obtained.

Hereinafter, the operation of this device will be discussed. Herein, gold dot layers 18, 19 are used in place of the reflective layers of the first embodiment. The gold dot layers 18, 19 have many carriers in themselves and many plasmons are generated within the undoped InP layer. As a result, the satisfactory effect can be expected without overlapping a multiplicity of reflective layers like the first embodiment. Specifically, the effect of photonic crystal can be achieved by forming a double layer of gold dots 18 at the lower position and a single layer of gold dots 19 at the upper position. The reason for this is that since the plurality of gold dots 18, 19 are extremely closely aligned with a spacing of 10 to 30 nm, a three-dimensional photonic crystal is formed. It should be noted that where no voltage is applied, the absorption edge wavelength of the refraction index adjusting layer 4 is 1.28 μm.

In this case, the refraction index is 3.2. The distance between the upper and lower gold dot layers 18, 19 with respect to light having a wavelength of 1.3 μm is not equal to the wavelength of the light (λ=1.3 μm) but 1.15 μm, so that the light is reflected at the gold dots without passing through the device. If a reverse bias voltage of about 5 V is applied thereby increasing the wavelength of the absorption edge to 1.29 μm, utilizing the Franz-Keldysh effect, the refraction index of the InGaAsP layer increases to about 5.0. As a result, the total refraction index of the multiple films between the gold dot layers 18 and 19 increases to 3.6 so that the distance with respect to light of 1.3 μm becomes 1.3 μm and, in consequence, standing waves are formed between the gold dots 18, 19, allowing light transmission. If the applied voltage is increased to more than 5V, the distance between the gold dot layers 18 and 19 will excessively exceed the wavelength, resulting in light reflection. This phenomenon is the so-called, three-dimensional photonic bandgap phenomenon and therefore, the range of wavelength becomes broad and the device is applicable to light emitting diodes having a wide spectrum. In consequence, the transmission property shown in FIG. 10(*a*) can be obtained so that the light signal modulated by the signal shown in FIG. 10(*c*) has the intensity indicated by solid line (Type A) of FIG. 10(*d*).

Numerous modifications and alternative embodiments of the invention will be apparent to those skilled in the art in view of the foregoing description. Accordingly, the description is to be construed as illustrative only, and is provided for the purpose of teaching those skilled in the art the best mode of carrying out the invention. The details of the structure and/or function maybe varied substantially without departing from the spirit of the invention and all modifications which come within the scope of the appended claims are reserved.

What is claimed is:

1. A vertical optical modulator comprising:
   a first semiconductor layer of a first conductivity type;
   a second semiconductor layer of a second conductivity type joined to the first semiconductor layer;
   a third semiconductor layer of the second conductivity type;
   a dielectric layer formed between the second semiconductor layer and the third semiconductor layer;
   an antenna electrode having a plurality of conductive pieces which are formed within the dielectric layer so as to have a net-like shape as a whole, to be separated from one another at the intersections of the net-like shape, and to be in contact with both the second semiconductor layer and the third semiconductor layer;
   a first electrode electrically connected to the first semiconductor layer; and
   a second electrode electrically connected to the third semiconductor layer.

2. The vertical optical modulator according to claim 1, wherein the width of the conductive pieces is substantially one third the spacing between the conductive pieces in a width-wise direction thereof.

3. The vertical optical modulator according to claim 2, wherein where the wavelength of a signal light modulated by the vertical optical modulator is λ, the width of the conductive pieces is substantially λ/3 and the spacing between the conductive pieces in a width-wise direction thereof is substantially λ.

4. The vertical optical modulator according to claim 1, wherein the plurality of conductive pieces have the form of a lattice-shaped net as a whole.

5. The vertical optical modulator according to claim 1, wherein the dielectric layer is an air layer.

6. The vertical optical modulator according to claim 1, wherein concentration of an impurity of the second conductivity type of the second and third semiconductor layers is lower than that of an impurity of the first conductivity type of the first semiconductor layer.

7. The vertical optical modulator according to claim 1, wherein the first semiconductor layer is formed on a semiconductor substrate.

8. The vertical optical modulator according to claim 7, wherein the semiconductor substrate is semi-insulative and the first electrode is formed on the first semiconductor layer whereas the second electrode being formed on the third semiconductor layer.

9. The vertical optical modulator according to claim 8, wherein the semiconductor substrate is electrically conductive and the first electrode is formed at the underside of the substrate whereas the second electrode being formed on the third semiconductor layer.

10. The vertical optical modulator according to claim 9, wherein the semiconductor substrate is of the first conductivity type.

11. The vertical optical modulator according to claim 1, wherein, in a plan view, the first semiconductor layer, the second semiconductor layer, the antenna electrode and the third semiconductor layer have the form of a circle substantially having a first diameter, and either one of the first and second electrodes has the form of a circular ring having an outer diameter substantially equal to the first diameter whereas the other one of the first and second electrodes has an opening having a diameter substantially larger than the first diameter, and
    wherein the first semiconductor layer, the second semiconductor layer, the antenna electrode, the third semiconductor layer, the first electrode and the second electrode are coaxially disposed.

12. The vertical optical modulator according to claim 1, wherein the first conductivity type is the n-type, whereas the second conductivity type is the p-type.

13. The vertical optical modulator according to claim 1, wherein the antenna electrode is made from a metal.

14. A process of fabricating a vertical optical modulator, the process comprising:
    a first crystal growth step of epitaxially growing, on a first semiconductor substrate, a first semiconductor layer of a first conductivity type and a second semiconductor layer of a second conductivity type in this order;

a first electrode formation step of forming an antenna electrode on the second semiconductor layer by vapor depositing an electric conductor film on the second semiconductor layer and performing lift-off, the antenna electrode having a plurality of conductive pieces which have a net-like shape as a whole and are separated from one another at the intersections of the net-like shape;

a substrate bonding step of bonding a second semiconductor substrate having a third semiconductor layer of the second conductive type to the first semiconductor substrate such that the third semiconductor layer faces the second semiconductor layer;

an etching step of removing the second semiconductor substrate; and a second electrode formation step of forming, after the etching step, a first electrode electrically connected to the first semiconductor layer and a second electrode electrically connected to the third semiconductor layer.

* * * * *

UNITED STATES PATENT AND TRADEMARK OFFICE
CERTIFICATE OF CORRECTION

PATENT NO. : 6,778,308 B2
DATED : August 17, 2004
INVENTOR(S) : Nobuyuki Otsuka et al.

It is certified that error appears in the above-identified patent and that said Letters Patent is hereby corrected as shown below:

Title page,
Item [75], Inventors, change "Kawanishi" to -- Hyogo --, "Hirakata" to -- Osaka --, and "Suita" to -- Osaka --
Item [56], References Cited, OTHER PUBLICATIONS,
"Yuji Kuwamura" reference, change "pp. 618-625" to -- pp. 616-625 --

Signed and Sealed this

Twelfth Day of April, 2005

JON W. DUDAS
*Director of the United States Patent and Trademark Office*